(12) United States Patent
Vernon et al.

(10) Patent No.: US 7,349,944 B2
(45) Date of Patent: Mar. 25, 2008

(54) SYSTEM AND METHOD FOR RECORD AND PLAYBACK OF COLLABORATIVE COMMUNICATIONS SESSION

(75) Inventors: Todd Vernon, Lafayette, CO (US); Dan Jones, Niwot, CO (US); David Bradley Rust, Park City, UT (US)

(73) Assignee: InterCall, Inc., Omaha, NE (US)

( * ) Notice: Subject to any disclaimer, the term of this patent is extended or adjusted under 35 U.S.C. 154(b) by 307 days.

(21) Appl. No.: 11/140,303

(22) Filed: May 26, 2005

(65) Prior Publication Data

US 2006/0200520 A1    Sep. 7, 2006

Related U.S. Application Data

(63) Continuation-in-part of application No. 10/392,293, filed on Mar. 18, 2003, now Pat. No. 7,313,595, which is a continuation of application No. 09/442,518, filed on Nov. 18, 1999, now Pat. No. 6,535,909.

(51) Int. Cl.
*G06F 15/16* (2006.01)

(52) U.S. Cl. .............................. 709/204; 709/217

(58) Field of Classification Search ........ 709/200–205, 709/217–227
See application file for complete search history.

(56) References Cited

U.S. PATENT DOCUMENTS

| | | | |
|---|---|---|---|
| 5,148,429 A | 9/1992 | Kudo et al. | |
| 5,359,598 A | 10/1994 | Steagall et al. | |
| 5,440,699 A | 8/1995 | Farrand et al. | |
| 5,483,587 A | 1/1996 | Hogan et al. | |
| 5,530,795 A | 6/1996 | Wan | |
| 5,559,875 A | 9/1996 | Bieselin et al. | |
| 5,583,993 A | 12/1996 | Foster | |
| 5,608,426 A | 3/1997 | Hester | |
| 5,608,872 A | 3/1997 | Schwartz et al. | |
| 5,617,423 A | 4/1997 | Li et al. | |
| 5,619,554 A | 4/1997 | Hogan et al. | |

(Continued)

FOREIGN PATENT DOCUMENTS

DE    19717167 A1    10/1998

(Continued)

OTHER PUBLICATIONS

Odlyzko, P., et al., "Varial Rate Block Encoding and Adaptive Latency Control for Packet Voice Communications," Motorola Technical Developments, Motorola Inc. 23:48-55 (1994).

(Continued)

*Primary Examiner*—Moustafa Meky

(57) ABSTRACT

A collaborative communication session ("session"), as created by the presenter and witnesses by one or more users on second computers, may be recorded. The session may be replayed by a user's computer, directing the audio and visual components of the browser on the user's computer as if the user was attending the live session. The recorded session replays the events of the live session in real time such that they playback experience contains the same audio and visual events that took place when the session was originally being recorded. Moreover, the recorded session may be encoded such that the session may be played back according to the client's playback capabilities, permissions and preferences.

17 Claims, 21 Drawing Sheets

U.S. PATENT DOCUMENTS

| | | | |
|---|---|---|---|
| 5,619,555 A | 4/1997 | Fenton et al. | |
| 5,623,603 A | 4/1997 | Jiang et al. | |
| 5,634,018 A | 5/1997 | Tanikoshi et al. | |
| 5,649,104 A | 7/1997 | Carleton et al. | |
| 5,668,863 A | 9/1997 | Bieselin et al. | |
| 5,706,502 A | 1/1998 | Foley et al. | |
| 5,742,670 A | 4/1998 | Bennett | |
| 5,745,711 A | 4/1998 | Kitahara et al. | |
| 5,748,898 A | 5/1998 | Ueda | |
| 5,754,830 A | 5/1998 | Butts et al. | |
| 5,761,419 A | 6/1998 | Schwartz et al. | |
| 5,764,901 A | 6/1998 | Skarbo et al. | |
| 5,778,368 A | 7/1998 | Hogan et al. | |
| 5,781,909 A | 7/1998 | Logan et al. | |
| 5,786,814 A | 7/1998 | Moran et al. | |
| 5,790,637 A | 8/1998 | Johnson et al. | |
| 5,809,247 A | 9/1998 | Richardson et al. | |
| 5,809,250 A | 9/1998 | Kisor | |
| 5,812,652 A | 9/1998 | Jodoin et al. | |
| 5,819,243 A | 10/1998 | Rich et al. | |
| 5,843,588 A | 12/1998 | Rose et al. | |
| 5,844,979 A | 12/1998 | Raniere et al. | |
| 5,894,556 A | 4/1999 | Grimm et al. | |
| 5,907,324 A | 5/1999 | Larson et al. | |
| 5,916,302 A | 6/1999 | Dunn et al. | |
| 5,930,238 A | 7/1999 | Nguyen | |
| 5,930,473 A | 7/1999 | Teng et al. | |
| 5,933,417 A | 8/1999 | Rottoo | |
| 5,940,082 A | 8/1999 | Brinegar et al. | |
| 5,944,791 A | 8/1999 | Scherpbier | |
| 5,953,506 A | 9/1999 | Kalra et al. | |
| 5,963,547 A | 10/1999 | O'Neil et al. | |
| 5,978,756 A | 11/1999 | Walker et al. | |
| 5,978,835 A | 11/1999 | Ludwig et al. | |
| 5,986,655 A | 11/1999 | Chiu et al. | |
| 5,990,933 A | 11/1999 | Ozone et al. | |
| 5,991,276 A | 11/1999 | Yanamoto | |
| 5,991,796 A | 11/1999 | Anupam et al. | |
| 5,995,606 A | 11/1999 | Civanlar et al. | |
| 5,995,608 A | 11/1999 | Detampel, Jr. et al. | |
| 5,995,951 A | 11/1999 | Ferguson | |
| 6,018,360 A | 1/2000 | Stewart et al. | |
| 6,018,774 A | 1/2000 | Mayle et al. | |
| 6,029,127 A | 2/2000 | Delargy et al. | |
| 6,049,602 A | 4/2000 | Foladare et al. | |
| 6,061,440 A | 5/2000 | Delaney et al. | |
| 6,061,717 A | 5/2000 | Carleton et al. | |
| 6,061,732 A | 5/2000 | Korst et al. | |
| 6,072,463 A | 6/2000 | Glaser | |
| 6,100,882 A | 8/2000 | Sharman et al. | |
| 6,144,991 A * | 11/2000 | England | 709/205 |
| 6,151,621 A | 11/2000 | Coyler et al. | |
| 6,157,401 A | 12/2000 | Wiryaman | |
| 6,181,786 B1 | 1/2001 | Detampel, Jr. et al. | |
| 6,192,394 B1 | 2/2001 | Gutfreund et al. | |
| 6,237,025 B1 | 5/2001 | Ludwig et al. | |
| 6,240,444 B1 | 5/2001 | Fin et al. | |
| 6,263,365 B1 | 7/2001 | Scherpbier | |
| 6,295,551 B1 | 9/2001 | Roberts | |
| 6,298,129 B1 * | 10/2001 | Culver et al. | 379/202.01 |
| 6,301,258 B1 | 10/2001 | Katseff et al. | |
| 6,310,941 B1 | 10/2001 | Crutcher et al. | |
| 6,335,927 B1 | 1/2002 | Elliott et al. | |
| 6,343,313 B1 * | 1/2002 | Salesky et al. | 709/204 |
| 6,381,568 B1 | 4/2002 | Supplee et al. | |
| 6,411,988 B1 | 6/2002 | Tafoya et al. | |
| 6,463,038 B1 | 10/2002 | Wilson | |
| 6,477,176 B1 | 11/2002 | Hamalainen et al. | |
| 6,516,340 B2 * | 2/2003 | Boys | 709/204 |
| 6,542,936 B1 | 4/2003 | Mayle et al. | |
| 6,598,074 B1 | 7/2003 | Moller et al. | |
| 6,728,784 B1 | 4/2004 | Mattaway | |
| 6,785,244 B2 | 8/2004 | Roy | |
| 2003/0055899 A1 | 3/2003 | Araki et al. | |

FOREIGN PATENT DOCUMENTS

| | | |
|---|---|---|
| EP | 0622931 A2 | 11/1994 |
| EP | 0779732 A2 | 6/1997 |
| EP | 0874323 | 10/1998 |
| EP | 0874323 A1 | 10/1998 |
| EP | 0908824 | 4/1999 |
| EP | 0957437 A2 | 11/1999 |
| JP | 7049837 A | 5/1995 |
| JP | 11249995 A | 9/1999 |
| WO | WO 99/26153 A2 | 5/1999 |
| WO | WO 00/22802 A2 | 4/2000 |
| WO | WO 00/56050 | 9/2000 |
| WO | WO 01/69418 A1 | 9/2001 |

OTHER PUBLICATIONS

Universal Internet Conference Information System, H. Abdel-Wahab, I. Stoica, F. Sultan, Informatics and Computer Science 1996.

Multimedia Consultation Session Recording and Playback Using Java-based Browser in Global PACS, R. Martinez, P.Shah, Y. Yu, SPIE Conference on PACS Design and Evaluation vol. 3330 Feb. 1998.

Jacobs, S., et al., "Filling HTML Forms Simultaneously: CoWeb-Architecture and Functionality," Computer Networks and ISDN Systems 28(11): 1385-95 (1996).

Moralee D., "Scientific Graphics and Visulization Come to the Internet," Scientific Computing World, Mar. 1, 1995, pp. 31, 33, 34, 36 XP000571217 p. 34, '2:The Internet carries videoconferencing MICE across Europe.

Hao, MC, et al., "Collaborative Computing: A Multi-Client Multi-Server Environment", Conference on Organizational Computing Systems, Milpitas, CA, Aug. 12-16, 1995 Comstock N; Ellis C (EDS) pp. 206-213, XP000620968.

Proceedings of the Conference on Emerging Technologies and Applications, vol. 1 1996, pp. 60-63. Vetter, RJ, Junalacad, C. "A multimedia System for Asynchronous Collaboration".

"Interactive Remote Recording and Playback of Multicast Video Conferences", W. Holfelder (1998).

Sastry, C.R., et al., "Web Tour: A system to Record and Playback Dynamic Multimedia Annotations on Web Document Control," Proceedings fo the International Conference, Oct. 1999, pp. 175-178.

Paper entitled "Defendant and Counterclaimant WebEx Communications, Inc.'s Preliminary Invalidity Contentions" filed in *Raindance Communications, Inc. v. WebEx Communications, Inc.* and *WebEx Communications, Inc. v. Raindance Communications, Inc.*, Civil Action No. 6:05 CV 375 LED on Jan. 24, 2006.

Paper entitled "Defendant and Counterclaimant WebEx Communications, Inc.'s Amended Preliminary Invalidity Contentions" filed in *Raindance Communications, Inc. v. WebEx Communications, Inc.* and *WebEx Communications, Inc. v. Raindance Communications, Inc.*, Civil Action No. 6:05 CV 375 LED on Jan. 24, 2006.

Paper entitled "Complaint for Patent Infringement of United States Patent Nos. 6,535,909 and 6,621,834" filed in *Raindance Communications, Inc. v. WebEx Communications, Inc.* and *WebEx Communications, Inc. v. Raindance Communications, Inc.*, Civil Action No. 6:05 CV 375 LED on Oct. 14, 2005.

Paper entitled "Defendant WebEx Communications, Inc.'s Answer to Plaintiff Raindance Communications, Inc.'s Complaint, Counterclaims and Jury Demand" filed in *Raindance Communications, Inc. v. WebEx Communications, Inc.* and *WebEx Communications, Inc. v. Raindance Communications, Inc.*, Civil Action No. 6:05 CV 375 LED on Nov. 3, 2005.

Paper entitled "Plaintiff Raindance Communications, Inc.'s Reply to Defendant WebEx Communications, Inc.'s Answer, Counterclaims and Jury Demand" filed in *Raindance Communications, Inc.* v. *WebEx Communications, Inc.* and *WebEx Communications, Inc.* v. *Raindance Communications, Inc.*, Civil Action, No. 6:05 CV 375 LED on Nov. 23, 2005.

Paper entitled "Raindance Communications, Inc.'s Initial Disclosures" filed in *Raindance Communications, Inc.* v. *WebEx Communications, Inc.* and *WebEx Communications, Inc.* v. *Raindance Communications, Inc.*, Civil Action No. 6:05 CV 375 LED on Jan. 13, 2006.

Paper entitled "Plaintiff and Counterdefendant Raindance Communications, Inc.'s Additional Disclosures" filed in *Raindance Communications, Inc.* v. *WebEx Communications, Inc.* and *WebEx Communications, Inc.* v. *Raindance Communications, Inc.*, Civil Action No. 6:05 CV 375 LED on Jan. 30, 2006.

* cited by examiner

SYSTEM AND METHOD FOR RECORD AND PLAYBACK OF COLLABORATIVE COMMUNICATIONS SESSION

RELATED APPLICATIONS

The present application is a Continuation-in-Part under 35 U.S.C. § 120 of U.S. patent application Ser. No. 10/392,293 filed Mar. 18, 2003 entitled, "Systems and Method for Record and Playback of Collaborative Web Browsing Session which is a continuation of 09/442,518, and now U.S. Pat. No. 6,535,909 filed Nov. 18, 1999 entitled "System and Method for Record and Playback of Collaborative Web Browsing Session". The present application also relates to U.S. Pat. No. 6,668,273, entitled "SYSTEM AND METHOD FOR APPLICATION VIEWING THROUGH COLLABORATIVE WEB BROWSING SESSION", of concurrent ownership, (the "AppView Patent"), which is hereby incorporated by reference in its entirety. The present application also relates to U.S. Pat. No. 5,944,791, entitled, "COLLABORATIVE WEB BROWSER", of concurrent ownership, which is hereby incorporated by reference in its entirety. The present application also relates to U.S. Pat. No. 6,263,365, entitled "BROWSER CONTROLLER" of concurrent ownership, which is hereby incorporated by reference in its entirety. The present application also relates to U.S. patent application Ser. No. 10/676,899, filed on Sep. 30, 2003 entitled, "SYSTEM AND ARCHITECTURE FOR A MULTIMEDIA COLLABORATION SESSION" of concurrent ownership, which is hereby incorporated by reference in its entirety.

BACKGROUND OF THE INVENTION

1. Field of the Invention

The present invention relates generally to a system and method for browsing computer networks such as the World Wide Web ("Web"). More specifically, the present invention relates to a system and method for recording a collaborative Web browsing session and the replay of a collaborative Web browsing session on the display of a computer connected to a server through a network.

2. Related Art

The Internet is comprised of a vast number of world-wide interconnected computers and computer networks. These interconnected computers exchange information using various services such as electronic mail ("email"), Gopher, telnet, file transfer protocol ("FTP"), and the Web. The Web allows a computer that is connected to the Internet to access data that is stored on other interconnected computers. The data available on these interconnected computers is divided up into segments that are colloquially referred to as "Web pages." The data collected together on a Web page is not restricted to a textual format. The data can be graphical, audio, moving picture, or any other compatible multi-media source.

As described above, a "Web page" as used herein refers to any segment of data available from a computer connected to a network and accessible through a browser application. The term Web page is intended only as a shorthand for any collection of related data available through a network, and should not be limited in interpretation to more restrictive meanings occasionally found in common usage. In particular, a Web page as used herein can comprise or include any type of media, media streams, synchronized multimedia, live or static data sources, or control and synchronization information. A Web page can refer to any data that is moved, or can be moved, across a network to accomplish a collaborative web browsing session or collaborative communication session.

Users gain access to Web pages by using an application program known as a "browser". Thus, an individual using a computer connected to the Internet can browse through various Web pages existing on computers around the world. A browser application program may provide a general-purpose rendering of Web-based content. Exemplary browser application programs include but are not limited to the Netscape and Internet Explorer browsers. A browser application program may also be specifically designed to provide access to a type of web media content or to access and present content for a predetermined purpose.

The ubiquitous nature of the Internet facilitates its use as a business tool. Accordingly, many Web pages are devoted to providing product marketing information and taking sales orders. Additionally, the Web can be used as a communication tool between a sales representative and a potential customer. For example, a collaborative Web browsing system can be used to allow a sales person to guide a potential customer through a predetermined set of Web pages that comprise a sales presentation. This is accomplished by allowing the sales person to control the potential customer's Web browser. Such a system is disclosed in U.S. Pat. No. 5,944,791 ("the '791 patent"), which is hereby incorporated by reference in its entirety.

The '791 patent provides a collaborative Web browsing system and method for allowing a first computer connected to the Web to cause the browsers of one or more second computers simultaneously connected to the Web to display certain predetermined Web pages or presentation slides as directed by the first computer. The problem is that often it is desirable for the user of the first computer ("Presenter") to be able to record and save the presentation so that the one or more second computers ("Client") can view the presentation at a later time.

For example, if a sales person scheduled a collaborative Web browsing session in order to show additional products that complement existing products, any customer that was unable to attend would miss the presentation. In order for the sales person to present the additional products to the absent customers, the sales person would have to schedule and present another collaborative Web browsing session.

Another example of this problem arises when the potential customers are unknown at the time of the collaborative Web browsing session. In this case, once the sales person ascertains who the potential customers are, additional time and resources are required for the sales person to present the session a second time. Furthermore, the potential exists for the sales person to have to present the collaborative Web browsing session a third and possibly more times.

Yet another example of this problem arises when the collaborative Web browsing session presents critical information. In such a case, an attendee may need to experience the presentation again in order to absorb the dense content. Furthermore, someone who was unable to attend may need to experience the presentation in order to get up to speed with the critical information. Unfortunately, if the presenter is no longer available, it is likely that the individual in later need of the presentation will be unable to view the presentation.

Therefore, the problem is that a collaborative Web browsing session cannot be viewed after the initial live interactive session. Furthermore, there is no way to allow a collaborative Web browsing session to be reviewed at a later time.

Accordingly, it is an object of the present invention to address these problems inherent in a collaborative Web browsing session.

SUMMARY OF THE INVENTION

As recognized by the present invention, it is desirable for the Presenter in a collaborative Web browsing session to be able to record the presentation for playback at a later time. Additionally, it is desirable for all of the elements of the presentation to be recorded including audio, predetermined slides and web pages, and dynamically integrated regions of the Presenter's display. An example of a method to dynamically integrate a region of the Presenter's display is found in the above-referenced AppView Patent. This would allow a sales presentation to be viewed by an absentee customer. It would also allow a presentation to be viewed by a future customer who was not known at the time of the presentation. Additionally, it would allow any other person, who attended the live presentation or not, to replay the collaborative Web browsing session for edification or business purposes. Thus, as recognized by the present invention, it is possible to provide a data structure on a computer readable medium that enables the replay of a previously recorded collaborative Web browsing session.

Accordingly, it is an advantage of the present invention to provide a data structure on computer readable medium that records the events of a collaborative Web browsing session, thus allowing the later replay of the previously recorded collaborative Web browsing session. Another feature of the present invention is to provide a data structure on a computer readable medium that can playback a previously recorded collaborative Web browsing session with real time correlation between the recorded audio and visual events. Yet another benefit of the present invention is to provide an easy-to-use and cost effective system and method for a first computer to cause a second computer to display images and play sounds recorded at a previous time by the first computer. Still another advantage of the present invention is to provide a data structure on a computer readable medium that can archive the audio and visual data events in a real time collaborative Web browsing session and allow access to that data such that the archives can be replayed at a later time.

A computer program product includes a program means stored on a computer readable medium that is readable by a digital processing system. As intended by the present invention, the computer program product is realized in a machine component that causes the digital processing system to perform method steps to enable a first computer to direct the browser of one or more second computers. As further intended by the present invention, the computer program product is realized in a machine component that causes a control site computer to record and archive a collaborative Web browsing session. Stated differently, a machine component establishes a computer program product for performing method steps to enable a control site computer to record the audio and visual components of a collaborative Web browsing session and archive that data as a session that is available for playback at a later time.

As disclosed in detail below, the present computer performable instructions include notifying the control site computer to begin recording the session, sending the session data to the control site computer in audio and visual data format, storing the audio and visual data on the control site computer, notifying the control site computer to stop recording the session, and merging the audio and visual data together on the control site computer. In one embodiment, the data merged together into one playback file is made available on the control site computer for later viewing. The computer program product is also disclosed in combination with the digital processing apparatus, and in further combination with the computer network.

In another aspect, a computer-implemented method is disclosed for allowing a control site computer to record and archive the audio and visual components of a collaborative Web browsing session. The method includes notifying the control site computer to start recording. In alternative embodiments, and as disk space becomes more plentiful, each collaborative Web browsing session could be automatically recorded, thus eliminating this step. The method further includes sending the audio and visual data elements to the control site computer. In one embodiment, this data is sent using the HTTP protocol over the Web. Additionally, the method includes storing the audio and visual data elements on the server and merging those elements together when the control site computer receives a stop recording notice. In an alternative embodiment, the control site computer could merge the audio and visual data elements as they are received, eliminating the need to merge the data upon completion of the session.

In still another aspect, a system is disclosed for allowing a control site computer to record an archive for later replay, the audio and visual components that comprise a collaborative Web browsing session. The system includes, at a first computer, logic means for notifying the control site computer to begin recording the session, and logic means for transmitting the audio and visual data components of the session. At the control site, logic means are provided for separately storing the audio and visual data elements and logic means for merging the audio and visual data into an archive file available for playback. Also at the control site, the system includes logic means for transmitting a replay of the session from the archive file to a second computer. At the second computer, the system includes logic means for requesting the playback of the archive file and logic means for displaying the visual data elements and playing the audio elements of the session.

Another aspect of the present invention provides for a data structure on a computer readable medium that can encode the session data such that playback of a previously recorded collaborative communication browsing session may be controlled according to the playback clients processing and bandwidth capabilities. Yet another benefit is provided by allowing the playback client to select which media stream of a recorded session to receive based on the playback client's capacity.

In yet another aspect, a computer-implemented method is disclosed for enabling the recorded audio and visual components of a collaborative Web communication to be encoded in a manner that allows playback on client with differing performance capabilities and connection types. The method includes a recorder client which captures media transmissions in the collaborative session, including the transmissions between the presenter client, playback client(s) and control server and produces a temporary file. The encoder processes the temporary file encodes the visual data as tracks in a multimedia archive file format, archives the audio and visual data on the control site computer, and merges the audio and visual data together for later playback.

DETAILED DESCRIPTION OF THE INVENTION

The present invention is directed toward a system and method for browsing computer networks such as the World Wide Web ("Web"). More specifically, the present invention relates to a system and method for recording a collaborative Web browsing session. Additionally, the present invention relates to the playback of a previously recorded collaborative Web browsing session on the monitor of a computer connected to a network, such as the Internet The term "collaborative Web browsing session" is meant to include any meeting in which several people or parties can communicate using data sent via connections established using shared electronic networks. Such a meeting can also be referred to by various terms, including a conference, a multimedia conference, a conference session, a collaboration session, a multimedia collaboration session, a collaborative communication session and a multiparty conference session. The data shared in a collaborative Web browsing session, referred to above as "web pages," can include any media sharable by electronic means, including for example voice, video, presentation materials, and screen images of application programs.

The term "participant" includes any person who is concurrently connected to a particular collaboration session and/or has the ability to communicate on a particular session or who receives a stream of data from the session. Participants share or communicate using browser applications to share and access media content. In one embodiment, the web pages of media shared includes one or more video streams. In another embodiment the web pages of shared media includes presentation materials prepared using the Power Point application. In another embodiment the shared web pages are derived from a region of a user's computer display, for example a window associated with a certain application program.

After reading this description it will become apparent to one of ordinary skill in the art how to implement the invention in alternative embodiments and alternative applications. As such, this detailed description of a preferred and alternative embodiments should not be construed to limit the scope of breadth of the present invention.

Figure 1A:
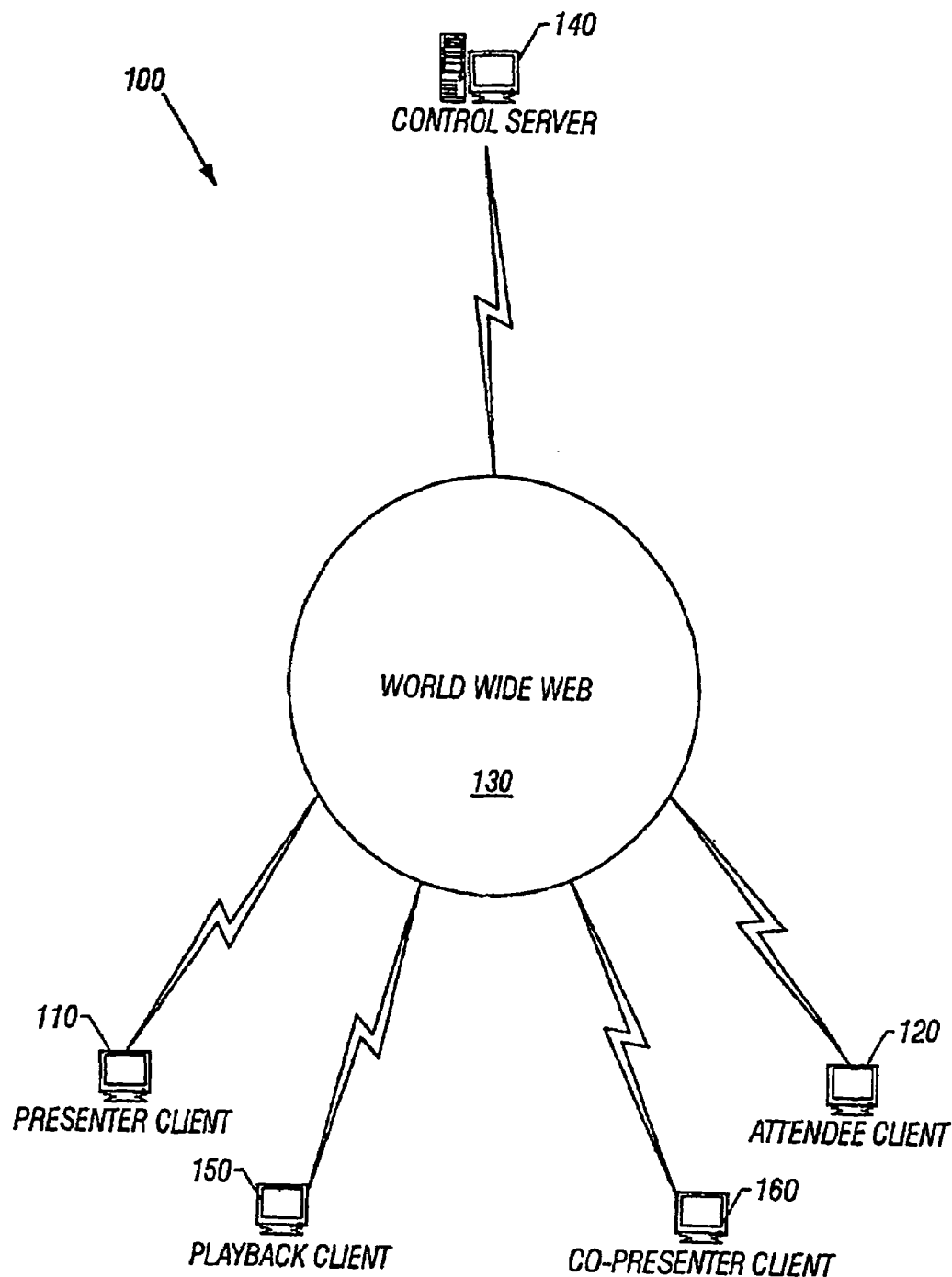
FIG. 1A is a functional diagram depicting an operational environment according to one embodiment of the present invention.
Figure 1B:
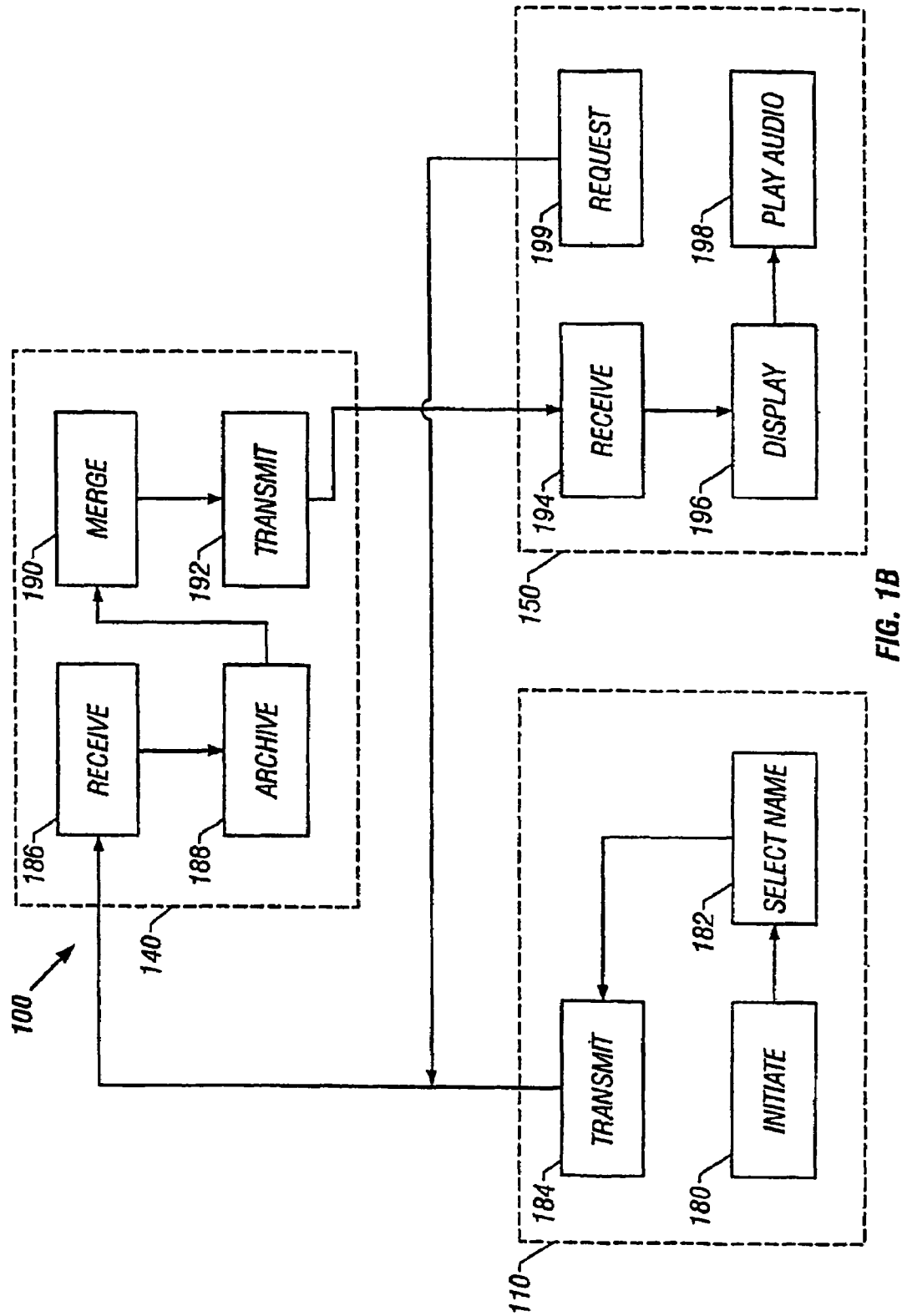
FIG. 1B is a block diagram depicting an operational environment according to one example of the present invention.
Figure 4:
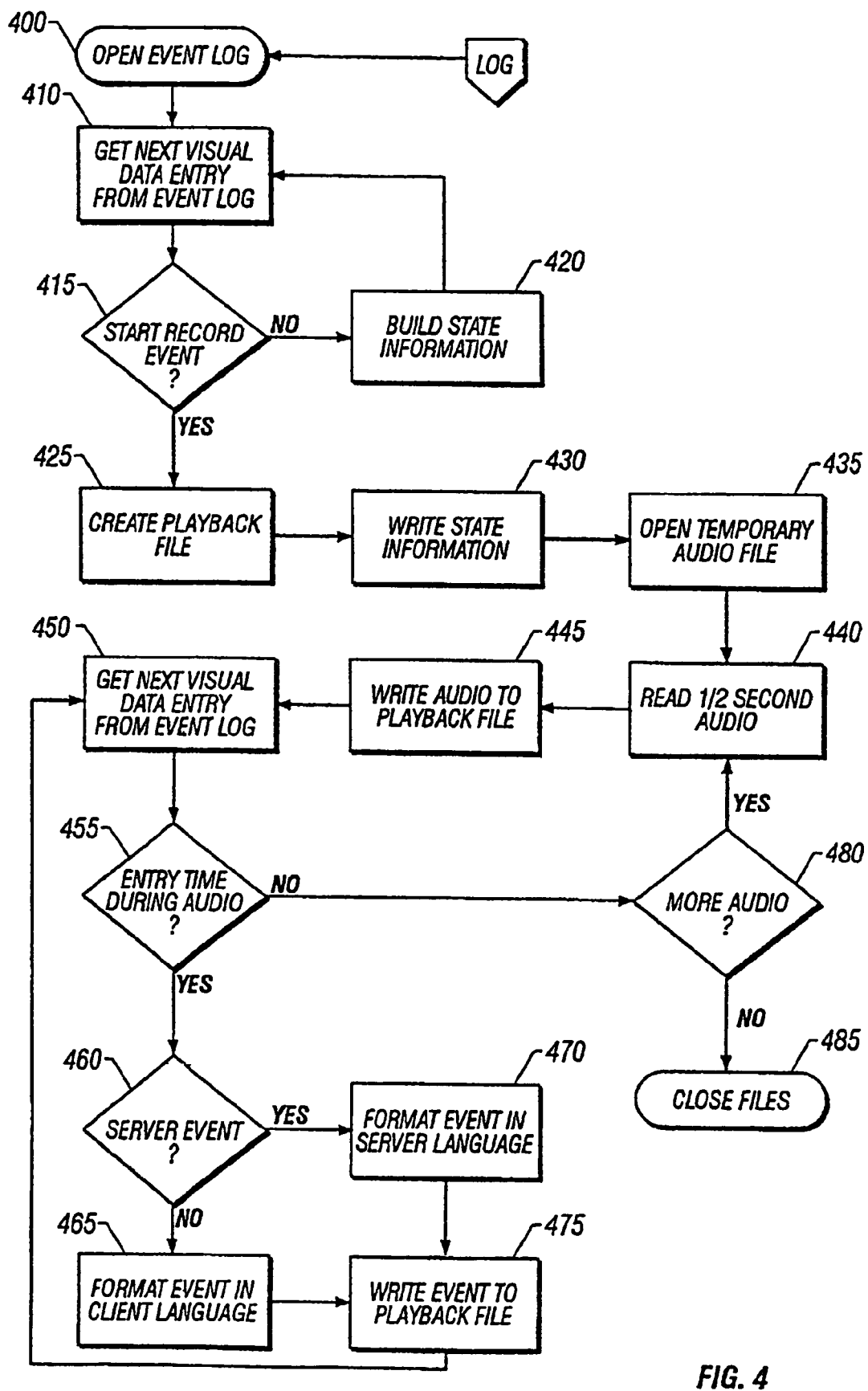
FIG. 4 is a flowchart depicting an example of a method that can be used by the Control Server to merge the audio and visual data elements of a recorded collaborative Web browsing session.
Figure 5:
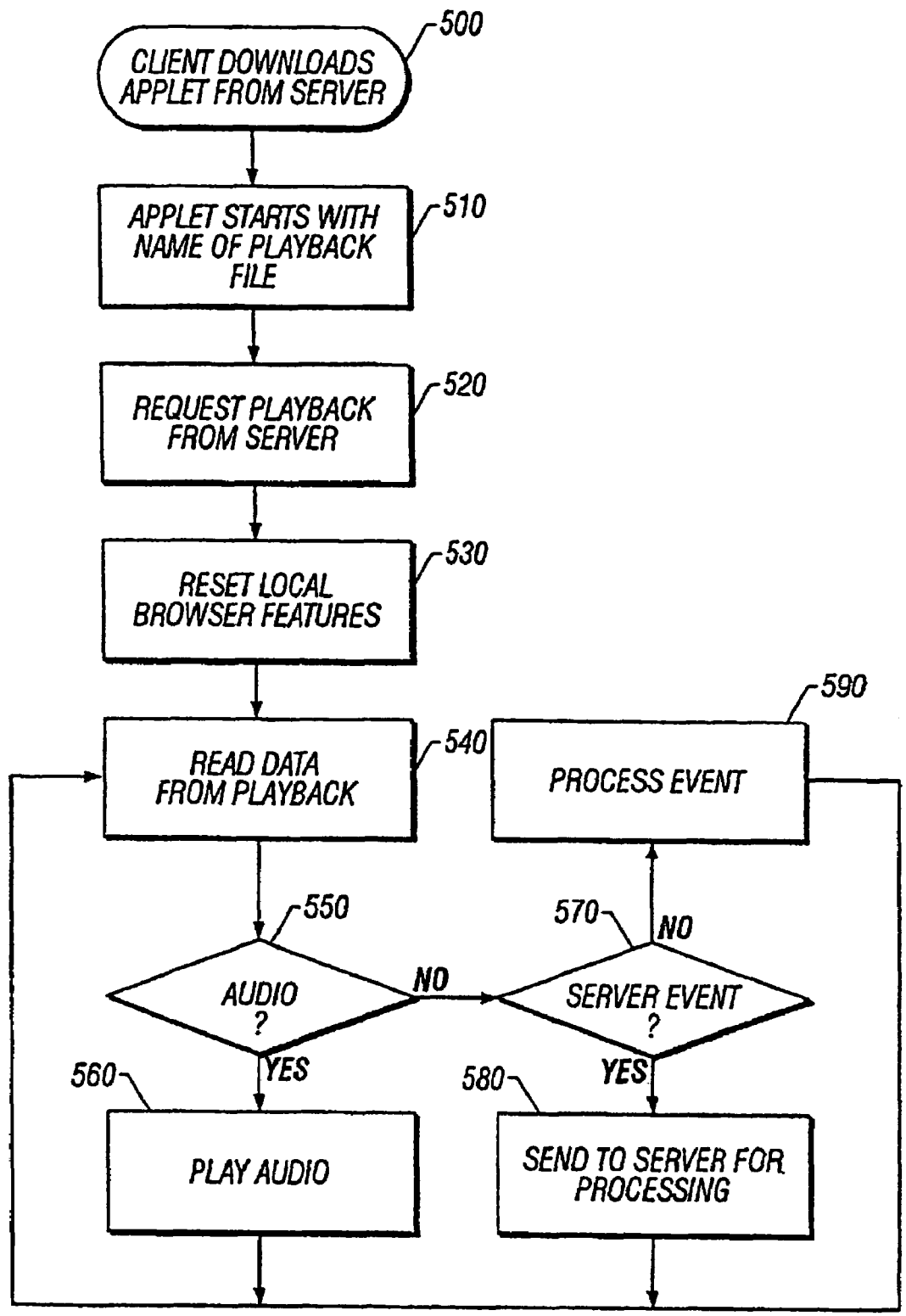
FIG. 5 is a flowchart depicting an example of a method that can be used by the Attendee Client to playback a previously recorded collaborative Web browsing session.
Figure 6:
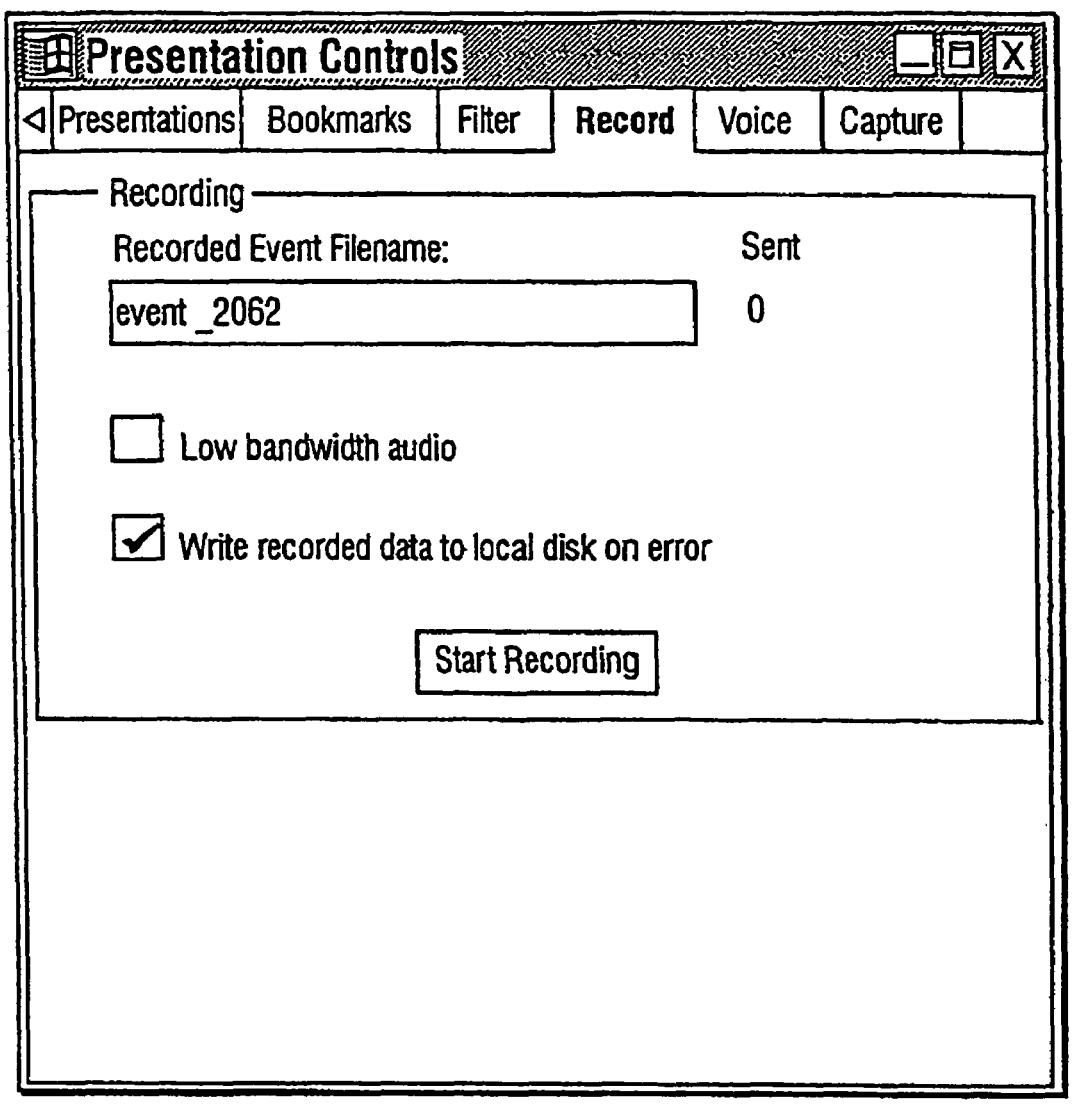
FIG. 6 depicts an example of a configuration window allowing the Presenter to set the name of the archive file and start recording the collaborative Web browsing session.

FIGS. 1A and 1B are diagrams that show example collaborative Web browsing sessions 100. FIGS. 2, 3, 4 and 5 are flowcharts that illustrate, as embodied in the present invention, the initialization of the recording process on the Presenter Client 110 computer, the storing of the audio and visual data elements on the Control Server 140, the merging of the audio and visual data into an archive file, and the playback of the session on the Playback Client 150. Additionally, FIG. 6 is an example of a control window which allows the Presenter Client 110 to initiate the recording of the collaborative Web browsing session 100. Those skilled in the art will appreciate that the Figures illustrate the structures of logic elements such as computer program code elements or logic circuits that function according to this invention. Manifestly, the invention is practiced in its essential embodiment by a machine component that renders the logic elements in a form that instructs a digital processing apparatus (a computer) to perform a sequence of function steps corresponding to those shown in the figures.

These instructions may reside on a program storage device including a data storage medium, such as a computer diskette, optical disk, compact disk ("CD"), or magnetic tape. Alternatively, such media can also be found in semiconductor devices, on a conventional hard disk drive, electronic read-only memory, electronic access memory, or on any other appropriate data storage device. In an illustrative embodiment of the invention, the logic means are computer executable instructions that are written in the Java programming language.

Referring initially to FIG. 1A, a functional overview of the present invention is shown. A collaborative Web browsing session 100 is initiated between the Presenter Client 110 and the Attendee Client 120. In an embodiment, this session is established over the Internet using the Web 130. The presenter Client 110 computer and the Attendee Client 120 computer can be any suitable computer such as a personal computer ("PC") or a laptop computer, each having a display, such as a video monitor or flat panel display for presentation. Also, the Web browsers used in the collaborative Web browsing session by the Presenter Client 110 and the Attendee Client 120 may be commercial browsers such as those made by Netscape and Microsoft or any specialized or application tailored browser application. Furthermore, it should be noted that the World Wide Web is just one example of a computer network that can be used with the present invention. In alternative embodiments, other types of computer networks can be used, including LANS, WANs, intranets, etc. Accordingly, the use of the Web 130 as an exemplary Computer network used in the explanatory examples should not be construed to limit the scope or breadth of the present invention.

Referring back to FIG. 1A, the collaborative Web browsing session 100 in an example embodiment is facilitated by the use of a Control Server 140, which includes a control module that enables the Presenter Client 110 to control the Web Browser of one or more Attendee Clients 120. Accordingly, the Presenter Client 110 has an active control associated with its Web browser. This active control can be a small application program referred to as an "applet." The applet running on the Presenter Client 110 allows the Presenter Client's 110 Web browser to communicate with the control module on the Control Server 140. This communication can take place via a computer network, such as the Web 130.

Similarly, the one or more Attendee Clients 120 (only a single Attendee Client is shown in FIG. 1A for clarity), include an applet that allows the Attendee Client's Web browser to communicate with the control module on the Control Server 140. In one embodiment, the communication between the Presenter Client 110, the Control Server 140, and to the Attendee Client 120 takes place through a computer network, such as the Web 130. Thus, FIG. 1A depicts a collaborative Web browsing session in which the Presenter Client 110 and the Attendee Client 120 use an applet to communicate with the Control Server 140 over a network such as the Web 130.

In another embodiment according to FIG. 1A, the Presenter Client 110 and the Attendee Client 120 use browser applications specifically designed for use by attendees in a collaborative communication session. In this case, the functions for communication between the clients 110 and 150 and the Control Server 140 are built0in to the browser as part of the design.

Additionally represented in FIG. 1A is the Playback Client 150. The Playback Client 150 computer can also be any suitable computer such as a personal computer ("PC") or a laptop computer, each having a display, such as a video monitor or flat panel display for presentation. Moreover, the Web browser used by the Playback Client 150 may be any commercial browser, such as those made by Netscape and Microsoft. Alternatively, the Playback Client 150 may be a specialized browser. In another embodiment the browser used by the Playback Client 150 may be a media player application such as the QuickTime Player available from Apple Computer of Cupertino, Calif.

The Playback Client 150, in an example embodiment, is connected to the Control Server 140 through a network, such as the Web 130. In one embodiment, the Playback Client 150 replays a collaborative Web browsing session 100 after it has been recorded. For example, when a collaborative Web browsing session is being broadcast over the Web, the Attendee Client 120 is contemporaneously participating in the session. Conversely, when the session is complete and the audio and visual events have been recorded, a Playback Client 150 may later desire to review the session. Thus, FIG. 1A additionally depicts an example of a Playback Client 150 viewing a previously recorded collaborative Web browsing session 100 over a network such as the Web 130.

FIG. 1B represents a block diagram of the recording and replay of a collaborative Web browsing session 100. In one embodiment, the Presenter Client 110 has an Initiator 180 by which the Presenter Client 110 may begin recording the session. For example, the Present Client 110 may have a control window with a button that starts the recording of the session. Additionally, the Presenter Client 110 has a Selector 182 that allows the Presenter Client 110 to choose the name for the recorded session archive. For example, the Presenter Client 110 may have a control window with a field in which the Presenter Client 110 can type in the desired filename. An example of a control window with a button to start recording and an entry field for the desired recording file name is discussed below with reference to FIG. 6. Also in this example embodiment, the Presenter Client 110 has a Transmitter 184 that allows the Present Client 110 to send the audio and visual data elements of the collaborative Web browsing session to the Control Server 140.

In another embodiment Control Server 140 can determine the name for the Archive 188 and provide the name to the Presenter Client 110. In one embodiment, the name of the Archive 188 can comprise a Uniform Resource Locator (URL) to allow the access of the archive as an address on the Web.

Accordingly, the Control Server 140 has a Receiver 186 that receives the audio and visual data elements from the Presenter Client 110. In this example embodiment, the Control Server 140 also has an Archiver 188 that separately stores the audio and visual data elements that comprise the collaborative Web browsing session 100. In an alternative embodiment, the Archiver 188 may store the audio and visual data elements together in the same file. For example, in one embodiment, the audio and visual data elements are stored separately and then later merged into the archive file by the Merger 190 on the Control Server 140. Alternatively, the Archiver 188 may merge the audio and visual data together as its stores the data in the archive file.

In one embodiment, the Receiver 186 on the Control Server 140 also receives requests from the Playback Client 150. For example, the Playback Client 150 is connected to the Control Server 150 via the Web and can send requests through its Requestor 199. The Playback Client 150 requests that the Control Server 140 replays a certain collaborative Web browsing session 100. The Playback Client 150 sends this request through its Requestor 199 and the Control Server 140 receives this request through its Receiver 186.

Continuing the example, once the Control Server 140 receives the request, the Transmitter 192 begins transmitting the contents of the archive file to the Playback Client 150. The Playback Client 150 has a corresponding Receiver 194 that receives the data from the archive file sent by the Control Server 140. When the data is received by the Playback Client 150, the data is processed by the Playback Client 150. Processing by the Playback Client 150 may alternatively require internal handling by the applet, displaying of visual data on the Playback Client 150 monitor by the Displayer 196, or channeling of audio data through Playback Client 150 speakers by the Player 198. Thus, in this example, the Playback Client 150 experiences the same audio and visual data elements of the collaborative Web browsing session 100 as did the Attendee Clients 120.

Figure 2:
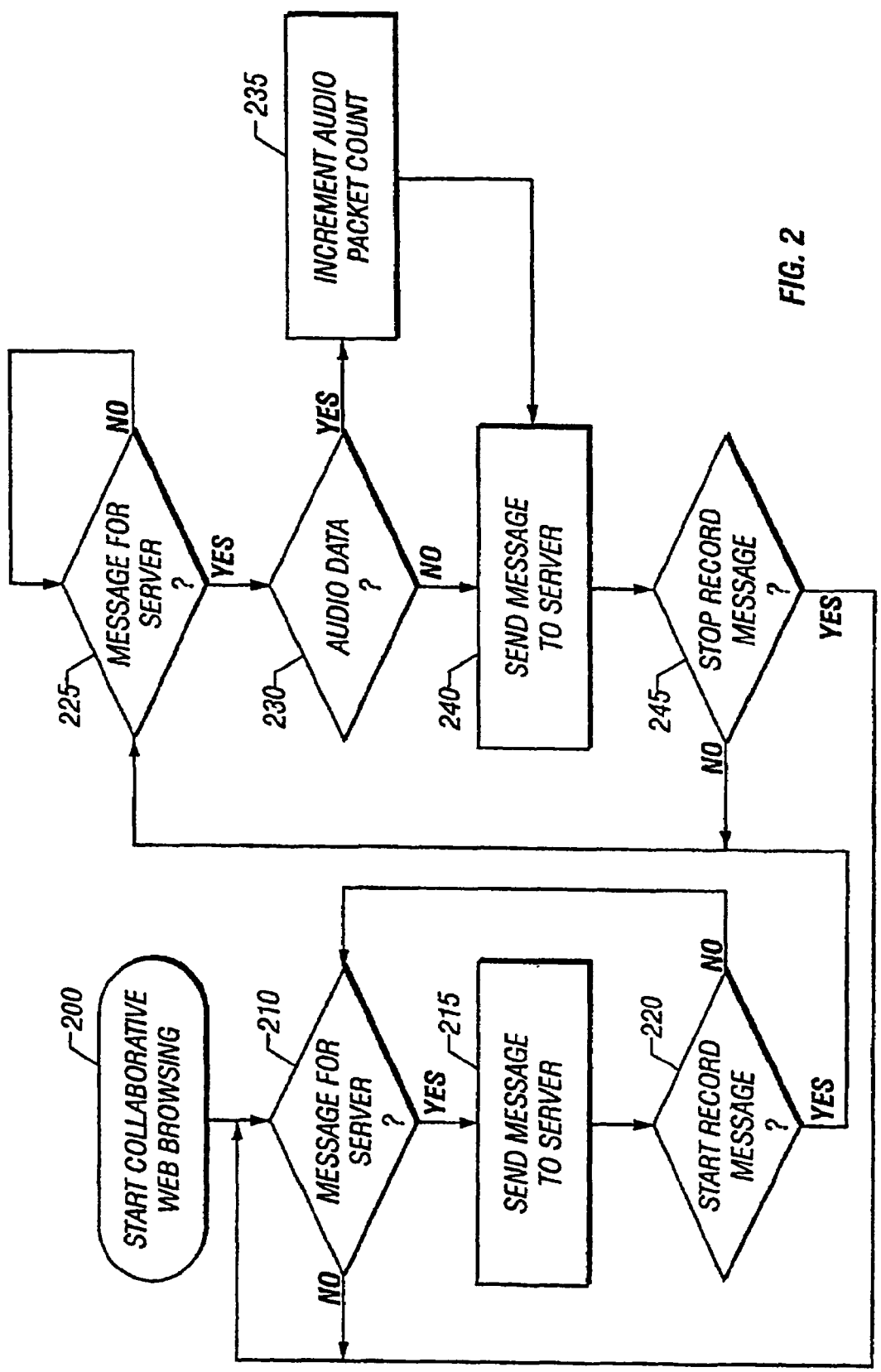
FIG. 2 is a flowchart depicting an example of a method that can be used by the Presenter to originate the audio and visual data events contained in a collaborative Web browsing session.

To start the recording of a collaborative Web browsing session 100, the Presenter Client 110, for example, initiates the recording process. FIG. 2 illustrates one example of an initialization process of the present invention. For example, after the collaborative Web browsing session 100 has commenced, as indicated by step 200, the Presenter Client 110 applet waits for messages to send to the Control Server 140. In one embodiment, upon receipt of the message, the Presenter Client 110 sends the message to the Control Server 140, as illustrated in step 215. When the Presenter Client 110 receives the message, it can examine the message to determine if the message indicates to start the recording process, as shown, for example, in step 220.

In one embodiment, after the recording of the collaborative Web browsing session 100 begins, the Presenter Client 110 applet continues to wait for messages to send to the Control Server 140, as indicated in step 225. For example, when recording, the Presenter Client examines the messages to be sent to the server. If the message represents an audio event, as illustrated in step 230, the Presenter Client 110 increments a counter to keep track of the number of audio messages sent to the Control Server 140, as illustrated in step 235. This allows the Control Server 140 to later verify receipt of the entire set of audio events contained in the collaborative Web browsing session 100.

Continuing the example, in step 240 the Presenter Client 110 sends the message to the Control Server 140, regardless of the message type. In one embodiment, during the recording process, the Presenter Client 110 examines each message sent to the Control Server 140 to determine whether to stop recording, as illustrated in step 245.

Figure 3:
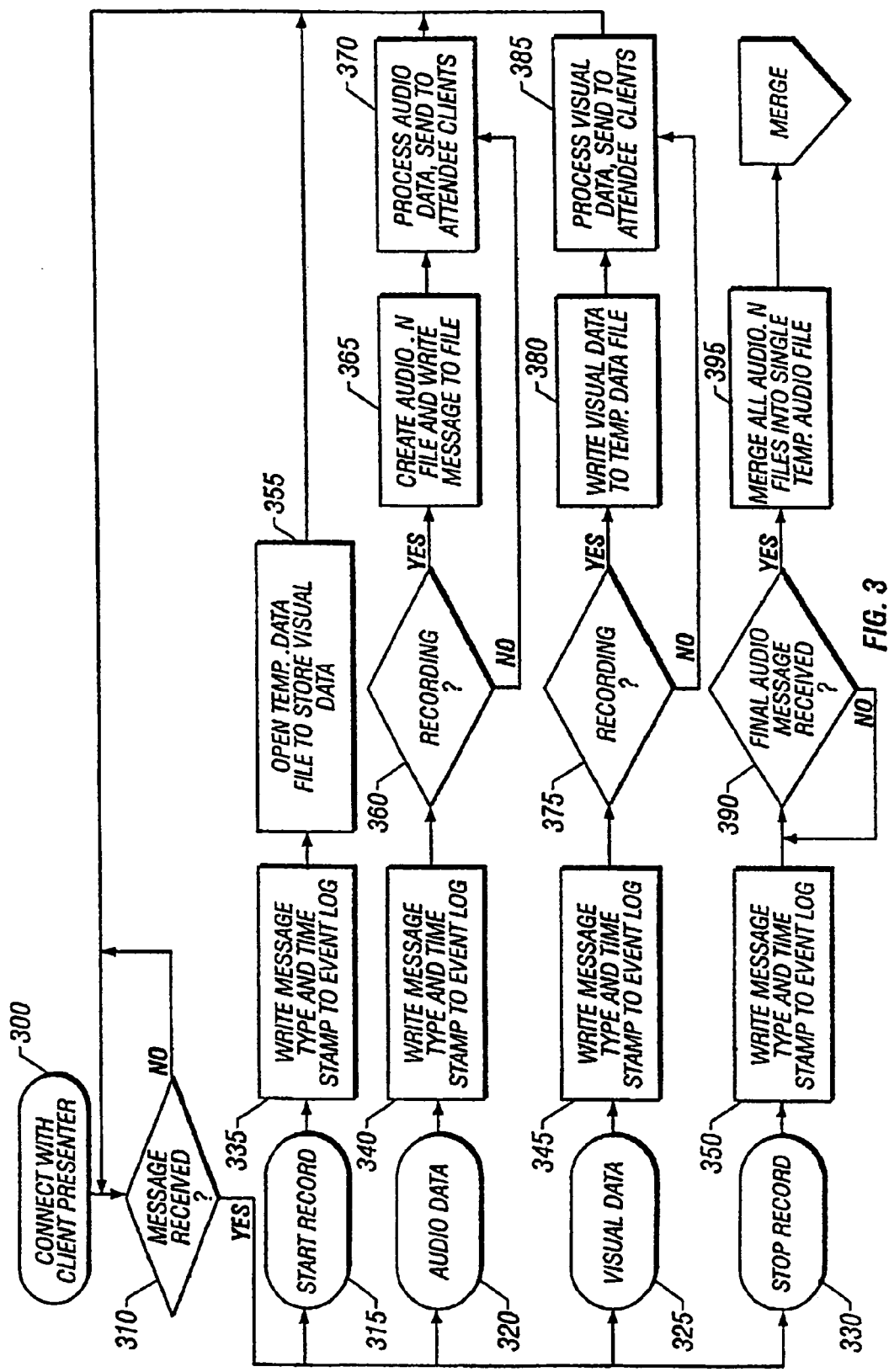
FIG. 3 is a flowchart depicting an example of a method that can be used by the Control Server to separate and record the audio and visual data elements of a collaborative Web browsing session 100.

When the recording process is initiated, the Control Server 140, in one embodiment, begins storing the audio and visual data components of the collaborative Web browsing session 100. FIG. 3 is a flowchart that depicts an example of the actions that may take place on the Control Server 140 during the recording of a collaborative Web browsing session 100. In one embodiment, the collaborative Web browsing session 100 has already commenced, as illustrated by step 300. For example, in step 310, the Control Server 140 waits for messages from the Presenter Client 110. When a message is received, the Control Server 140 can determine whether the message is a start record 315 event, audio data 320, visual data 325, or a stop record 330 event. The Control Server 140, in an example embodiment, subsequently processes each message depending on its type. For example, each message received by the Control Server 140 is written into an event log to record the message type and the time the message was received, as shown in steps 335, 340, 345, and 350.

In one embodiment, a start record 315 event causes the Control Server 140 to begin recording the session. For example, upon receiving the start record 315 event, the Control Server 140 writes an entry into the event log and then the Control Server 140 opens a temporary file, as shown in step 355. This temporary file is used to store the visual data elements that are being recorded for the session.

In one embodiment, when the Control Server 140 is recording, an audio data 320 event is recorded by the Control Server 140 in a separate audio file. For example, when an audio event is passed to the Control Server 140, the Control Server 140 writes an entry into the event log and then stores the audio element in a separate, unique file, as illustrated in steps 360 and 365. Alternatively, the Control Server 140 could store all of the audio events in the same file. In one embodiment, the Control Server 140 might store all of the audio and visual data elements in the same file. In one embodiment, when the Control Server 140 is not recording the collaborative Web browsing session 100, audio data events are passed directly along to the Attendee Clients 120, as indicated by step 360.

In one embodiment, when the Control Server 140 is recording, visual data 325 events are written to a temporary file as shown in step 380. For example, when the Control Server 140 receives a visual data event while recording is in progress, the Control Server 140 first writes an entry into the event log and then writes the visual data element to the temporary data file opened up in step 355. In the same example, when the Control Server 140 is not recording, visual data 325 events are set along to the Attendee Clients 120 as portrayed in step 385.

In one embodiment, a stop record 330 event causes the Control Server 140 to end the recording session. For example, in step 390, upon receipt of the stop recording message and after writing an entry into the event log, the Control Server 140 waits until it has received all of the audio messages contained in the session being recorded. Once the Control Server 140 has all of the audio elements, the Control Server 140 merges all of the separate audio files into a single audio file as illustrated in step 395.

In one embodiment, the merging process takes place after the Presenter Client 110 has sent the stop record message to the Control Server 140. FIG. 4 is a flowchart depicting an example of a merging process that can be used by the Control Server 140 to integrate the audio and visual data elements that comprise the recorded collaborative Web browsing session 100.

In one embodiment, the initial step for merging the audio and visual data elements is the opening and reading of the event log. For example, in step 400, the Control Server 140 opens the event log file and subsequently in step 410, the Control Server 140 retrieves an entry from the same event log. Continuing the example, the Control Server 140 continues to retrieve entries from the event log until the start record 315 event is found, as illustrated in step 415. During this time, the Control Server 140 is building the initial state information as depicted in step 420. In one embodiment, the state information recreates the look and feel of the Presenter Client's 110 computer immediately prior to the start of the recorded collaborative Web browsing session 100.

In an alternative embodiment, there can be more than one Presenter Client 110 recording a collaborative Web browsing session 100. In such a case, the Control Server 140 would necessarily be required to verify that the encountered start record 315 event is the correct start record 315 event. Once verified, the Control Server proceeds to create the playback file. For example, when the Presenter Client 110 is recording the session and a Co-Presenter Client 160 is also recording the session, there would be two start record 315 messages in the event log.

In one embodiment, when the correct start record 315 event has been encountered and the initial state has been established, the Control Server 140 creates the archive file. For example, as shown in step 425, the Control Server 140 creates a playback file to contain all of the audio and visual data events comprising the collaborative Web browsing session 100. Alternatively, audio events and log entries of the visual data events can be stored in a first archive file while the visual data corresponding to the log entries is stored in a second, corresponding archive file. In the present example, illustrated in step 430, the first entries written in the playback file by the Control Server 140 set up the initial state for the Playback Client's 150 browser.

Next, the Control Server 140 opens up the temporary audio file in step 435 and starts reading audio events from that file. In one embodiment, the audio data 320 elements are read in ½ second increments. For example, the Control Server 140 reads ½ second of audio from the temporary audio file and then writes that audio data into the archive file, as illustrated in step 445. At this point, the Control Server 140 can consult the event log to see if any events from the log took place during the ½ second period covered by the audio data previously written to the archive file. For example, in step 450, the Control Server 140 retrieves the next entry from the event log and compares its timestamp to that of the previously written audio element in step 455. Alternatively, the Control Server 140 can construct the timestamp based on a formula such as: ½ seconds*[the number of increments processed]+[time of the start record 315 event]. If the entry from the event log took place during the ½ second of audio, then the Control Server 140 writes that entry into the archive file for contemporaneous execution with the ½ second of audio.

In one embodiment, the Control Server 140 determines if the event in the log file is of the type that must be handled by the Control Server 140. For example, if the Control Server 140 determines, in step 460, that the event in the log file is a Control Server 140 event, the Control Server 140 formats the event in Control Server 140 language in step 470, prior to writing that event into the archive file in step 475. Conversely, if the Control Server 140 determines that the event is not a Control Server 140 event, then the Control Server 140 formats the event Playback Client 150 language in step 465, prior to writing that event into the archive file in step 475.

In one embodiment, the Control Server 140 determines whether the event log entry took place within the previously read ½ second of audio. if the event did not take place within that ½ second, the Control Server 140 reads another ½ second of audio and writes that data element into the archive file. For example, if the next event from the event log was time stamped as taking place 5 seconds after the previously written audio data, the Control Server 140 would write 10 more audio data elements to the archive file before writing that event from the event log. In one embodiment, when there are no more audio elements left, the archive file is closed and the merging process is complete. For example, once the Control Server 140 has read the last entry in the temporary audio file, the Control Server 140 checks to see if there is any audio data left. Because there is not, the Control Server 140 closes the archive file and does not attempt to add any additional elements from the event log. In one embodiment, when the audio elements are exhausted, the recorded collaborative Web browsing session 100 has ended.

In one embodiment, the Playback Client 150 can select to view a number of previously recorded collaborative Web browsing sessions 100. FIG. 5 is a flowchart depicting an example of a playback process that can be used by the Playback Client 150 to view a previously recorded collaborative Web browsing session 100. In one embodiment, the Playback Client 150, accesses the Control Server 140 and the previously recorded collaborative Web browsing sessions 100 via the Web 130. For example, after browsing through the Web pages of the Control Server 140, the Playback Client 150 selects a particular collaborative Web browsing session 100 to replay.

In one embodiment, the Playback Client 150 selects the session by clicking the mouse on an object representing that session. For example, in step 500 the Playback Client 150 begins the playback process by downloading an applet from the Control Server 140 computer. In one embodiment, this applet starts to run on the Playback Client 150 computer and causes the Playback Client's 150 Web browser to relinquish control to the Control Server 140. For example, in step 510 when the applet begins to run on the Playback Client's 150 computer, the name of the archive file is known to the applet. Thus, in step 520, the applet requests the particular archive file from the Control Server 140 for playback. Continuing the example, after the applet has requested the playback file from the Control Server 140, in step 530 the applet resets the features of the Playback Client 150 browser.

In one embodiment, the Playback Client 150 applet receives the archived session data from the Control Server 140 and processes that data. For example, in step 540, the Playback Client 150 reads the incoming data from the Control Server 140. Next, in step 550, the Playback Client 150 applet determines if it has received an audio event. If an audio event is encountered, the applet plays the audio as demonstrated in step 560. Alternatively, in step 570, if the data is not an audio event, the applet determines if the data represents a server event. If the Control Server 140 needs to process the data, as illustrated in step 580, the data is sent back to the Control Server 140 for the appropriate processing. if the data does not represent a server event, the applet handles the event locally for the Playback Client 150, as illustrated in step 590.

In one embodiment, after the element of archive data to be replayed has been processed, the Playback Client 150 repeats the process. For example, once the archived data has been sorted as an audio event, a server event, or a local event, the Playback Client 150 applet processes that data and then retrieves the next element of archived data from the Control Server 140. In one embodiment, the applet will receive all of the archived data from the Control Server 140 and process that data such that the Playback Client 150 views the previously recorded collaborative Web browsing session 100 as if attending the original session.

In alternative embodiments, the events comprising the session can be streamed to the Playback Client 150 as they are read by the Control Server 140 or the events comprising the session can be read in their entirety and sent to the Playback Client 150 in one large transmission. The data can be immediately processed by the Control Server 140 and sent to the Playback Client 150 as it is processed by the Control Server 140. However, the Control Server 140 may alternatively employ, for example, a checksum feature that reads the entire archive file and verifies the integrity of the whole before sending any data events to the Playback Client 150.

In one embodiment, the entire merging process takes place each time a session is requested for playback by the Playback Client 150. For example, the data comprising the session is stored in multiple files, one for audio data, one for visual data, and one for the chronological log of events comprising the session. Each time that a particular session is requested for playback, the Control Server 140 reads in the audio data file, the visual data file and the corresponding events from the log file. As the Control Server 140 chronologically merges the audio, visual, and other events together, those events are sent to the Playback Client 150. Thus, in this example, each time the session is replayed, the merging process is repeated.

FIG. 6 depicts an example of a control window that allows the Presenter Client 110 to select the name of the archive filename. Additionally, this example illustrates a method that allows the Presenter Client 110 to start the recording session, as discussed above with reference to step 315.

In another embodiment, the collaborative communication session is recorded in a manner which allows the recording to be played back according to the capabilities of the playback client. Specifically, playback clients may differ in their performance parameters, capabilities and connection types. Encoding the recorded collaborative web session as described herein allows playback clients to vary the playback rate of the recorded media stream such that the playback rate matches the playback client's capabilities. For example, the media stream making up a recorded collaborative communication session may be played back at a rate lower or higher than the original the original conference.

In yet another embodiment, the recorded collaborative communication session may be encoded in such a manner as to allow, based on the playback client capabilities, only select media streams to be delivered to the playback client. For example, as described above, a recorded collaborative web session may comprise a number of different media streams including, but not limited to, audio and visual. If the playback client does not have the capacity to handle all of the media streams, the media streams delivered to the client may be limited to only the audio files of the recorded collaborative communication session. Alternatively, the media streams delivered may be limited to only the audio and a subset of the visual streams recorded in the collaborative communication session.

Figure 14A:
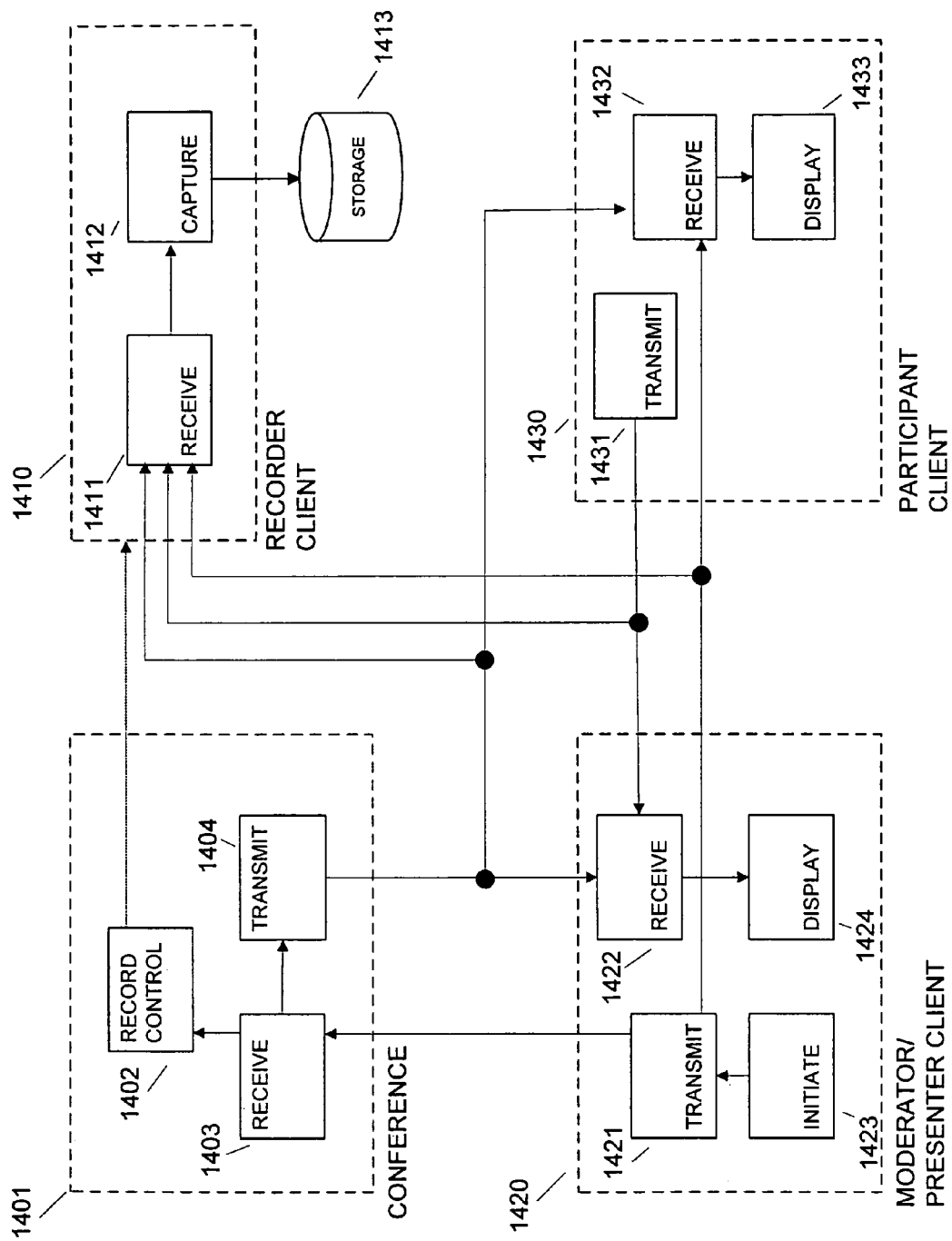
FIG. 14A and 14B are block diagrams depicting operational environments according to two examples of the recording systems and methods described herein.
Figure 14B:
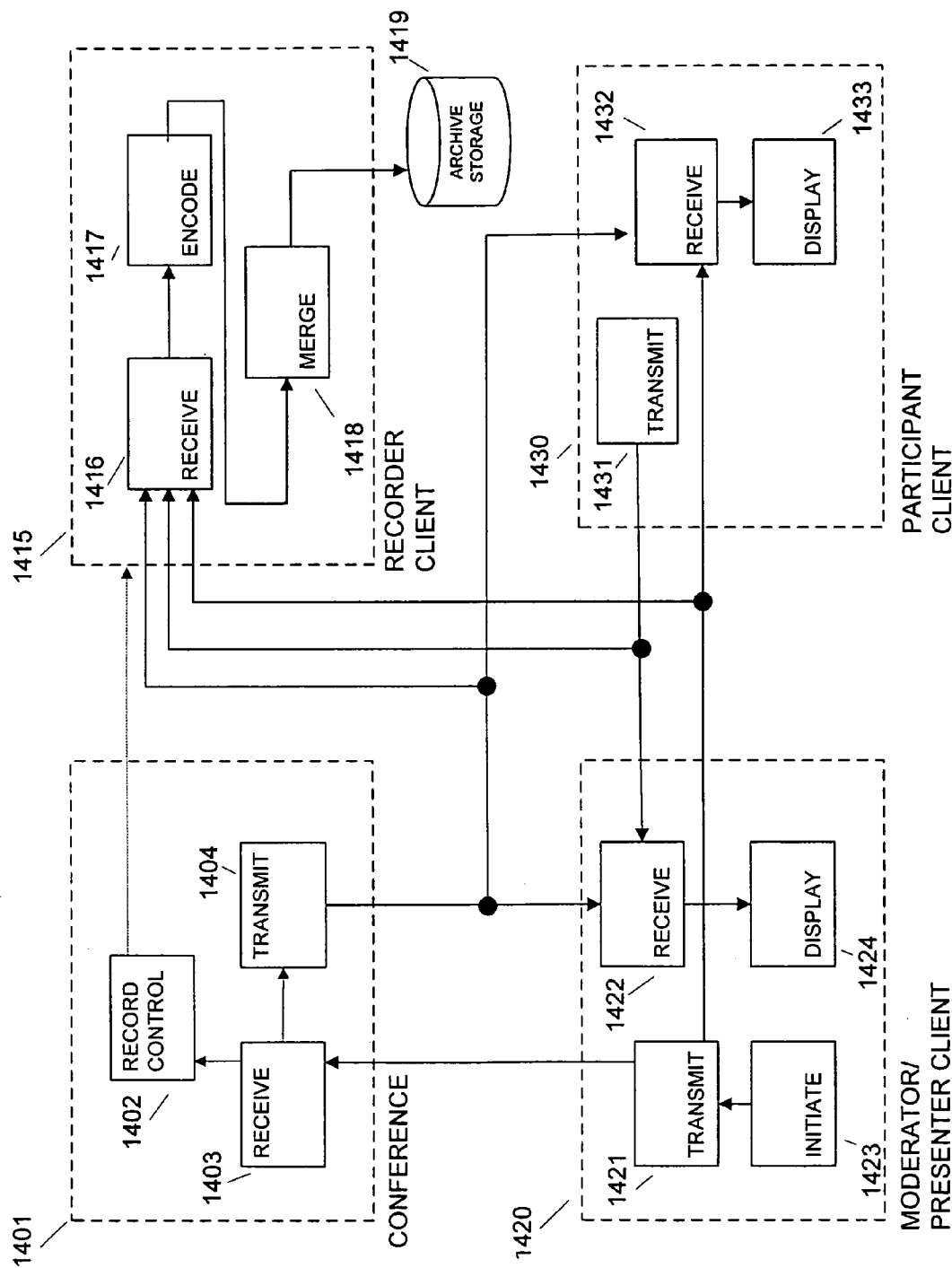

FIGS. 14A and 14B are schematic block diagrams of two example embodiments wherein the collaborative communication session can be encoded in a manner to allow playback according to the capabilities of the playback client. FIG. 14A is similar to 14B in most respects; however the recorder client in FIG. 1410 in FIG. 14A differs from the recorder client 1415 in FIG. 14B, as will be explained in the following sections. As illustrated, the system of both Figures includes a moderator/presenter client 1420, a participant client 1430, a conference object or server and a recorder client instance 1410. The moderator/presenter client 1420 and a participant client 1430 are both connected to conference object 1401 through network connections. As can be seen, some data streams connect directly between the presenter and participant clients 1420 and 1430, while others data streams are sent from each of the clients 1420/1430 to the conference object 1401 for retransmission to all clients. Control messages are also sent between conference object 1401 and each of the clients 1420/1430.

As further illustrated in FIG. 14A and FIG. 14B, each of the conference session elements 1401, 1420 and 1430, contain subcomponent elements including a transmitter and receiver for sending and receiving media data and control messages In addition, the two clients 1420 and 1430 each contain a display 1424/1433 for viewing media data. Clients can also include other elements, for example user interfaces and device drivers.

The recorder client 1410 illustrated in FIG. 14A is enhanced with the capability to receive 1411, capture 1412 and save conference data and events to a temporary storage area 1413. In one embodiment, this file will later be encoded and merged with audio data to create a playback file containing the data from up the collaborative communication.

Figure 9:
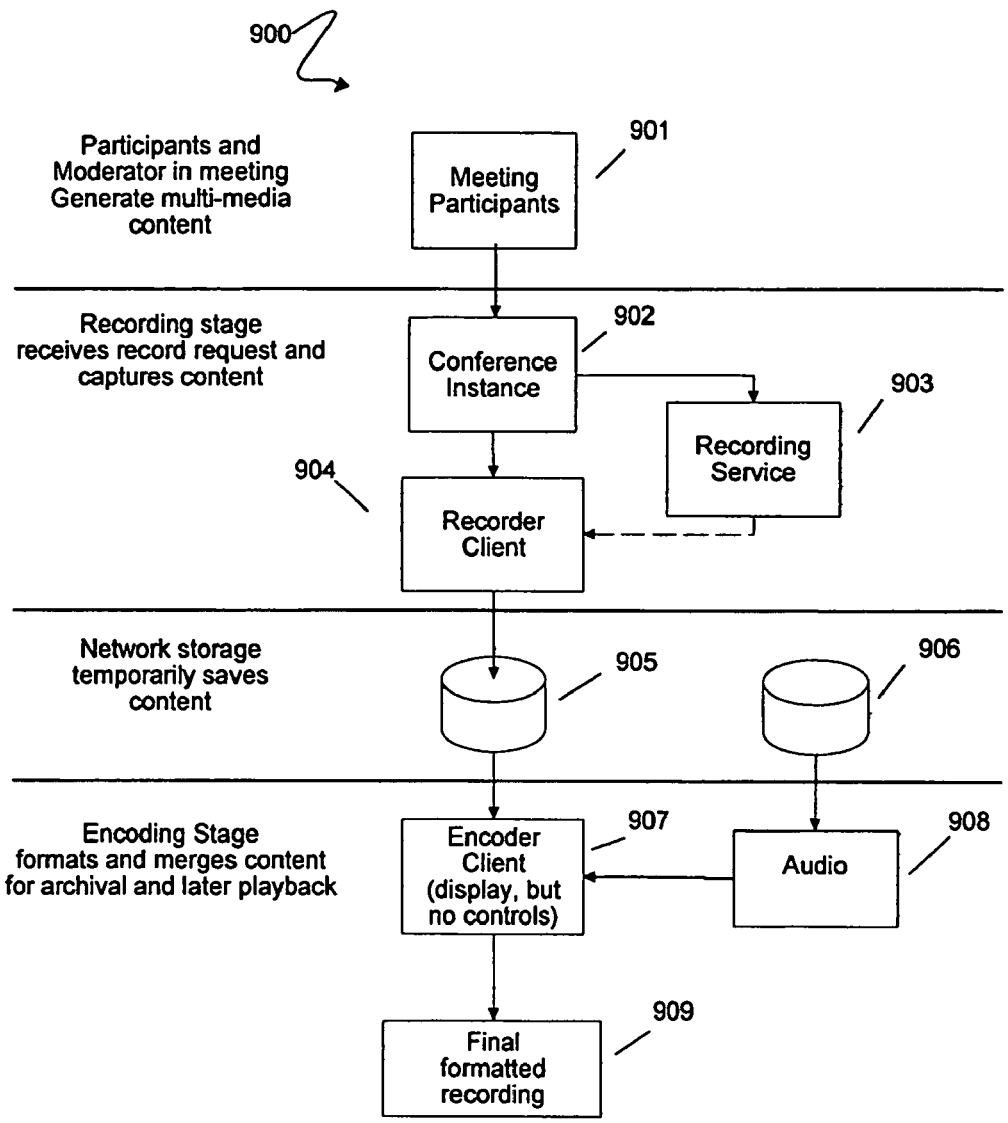
FIG. 9 is an example of steps in a method that can be used to create a recording file of a collaborative web browsing session.

The temporary storage 1413 can correspond to network storage 905 in FIG. 9. The recorder client 1410 may snoop the various media data streams transmitted between the presenter client 1420, the participant client 1430 and the conference object 1401. Advantageously, an instance of the recorder client 1410 may be located on any of the clients and is thus not limited to residing on a control or playback server.

In an alternative embodiment illustrated in FIG. 14B, the recorder client 1415 contains a receiver element 1416, an encoder 1417 and a merger 1418 for preparing conference data, timing, and control messages for storage in a recorded archive file in archive storage area 1419. Archive storage 1419 can correspond o archive storage 909 in FIG. 9.

Recorder client 1410 (FIG. 14A) and recorder client 1415 (FIG. 14B) each can act as a listen-only client capturing conference messages. In the embodiment illustrated in FIG. 14A, the messages are stored in one or more files for later processing to create an archived file. In the embodiment illustrated in FIG. 14B components of the recorder client 1415 prepare and store the conference messages for recording and later playback.

As can be seen from FIG. 14A and 14B, in one embodiment the recorder client 1410 (1415 in FIG. 14B) is similar in most respects to clients 1420 and 1430. Thus when recorder client 1410 (1415 in FIG. 14B) is joined into the conference upon start of recording, the recorder client receives media streams that would be received by any participant client in the conference. These streams can originate from any of the other clients 1420 or 1430, or from the conference 1401. In this way the recorder client 1410 (1415 in FIG. 14B) obtains media streams from the conference session data to pass to the encoder 1412, archiver 1413 and merging 1414.

The embodiment using a client-based application to obtain the media for recording has several advantages. One advantage is that the recorded media is obtained from the perspective of a participant in the conference so the later playback experience will be very similar to being a participant in the original session. Another advantage is that the interfaces for a client to join the conference are defined and conference architecture and messages are essentially the same regardless of whether a recorder client is present or not.

In one embodiment, each user of a conference client can make selections that affect the display on her client. However, the recorder client has no user to make display selections. In such an embodiment, it is necessary to provide a mechanism to provide selections on behalf of the recorder client. For example, in one embodiment the recorder client selections mimic those of the moderator. After the recorder client has joined the conference, media streams are available to the recording client for subsequent processes to create an archive file for later playback.

Turning now to the encoding process, FIGS. 7A-7D are a sequence flow diagram illustrating the encoding of a media stream into a file such that the media stream can be played back at different rates to accommodate, for example, a number of different client network connection bandwidths or client rendering capabilities. Specifically, it is desired to record the contents of a buffer that is changing over time. For example, such a buffer might contain video or other display data that is updating in response to an application being executed. The source for the data in the buffer can for example be a video camera and video capture device, a region of computer's display memory, or an internal off-screen bitmap Referring now to FIG. 7A, a series of frames 702, 703, 704, 705, 706, 707, 708 are shown. These frames illustrate a series of samples of a time-changing buffer as stored in a media recording file resulting from the recording process as described above. The buffers shown are in a time-ordered series. Thus, buffer 703 is captured after buffer 702 and before buffer 704, and so on. It should be noted that only a few frames are shown as illustrative elements. Typical media files contain a very large number of frame buffer elements.

Figure 7A:
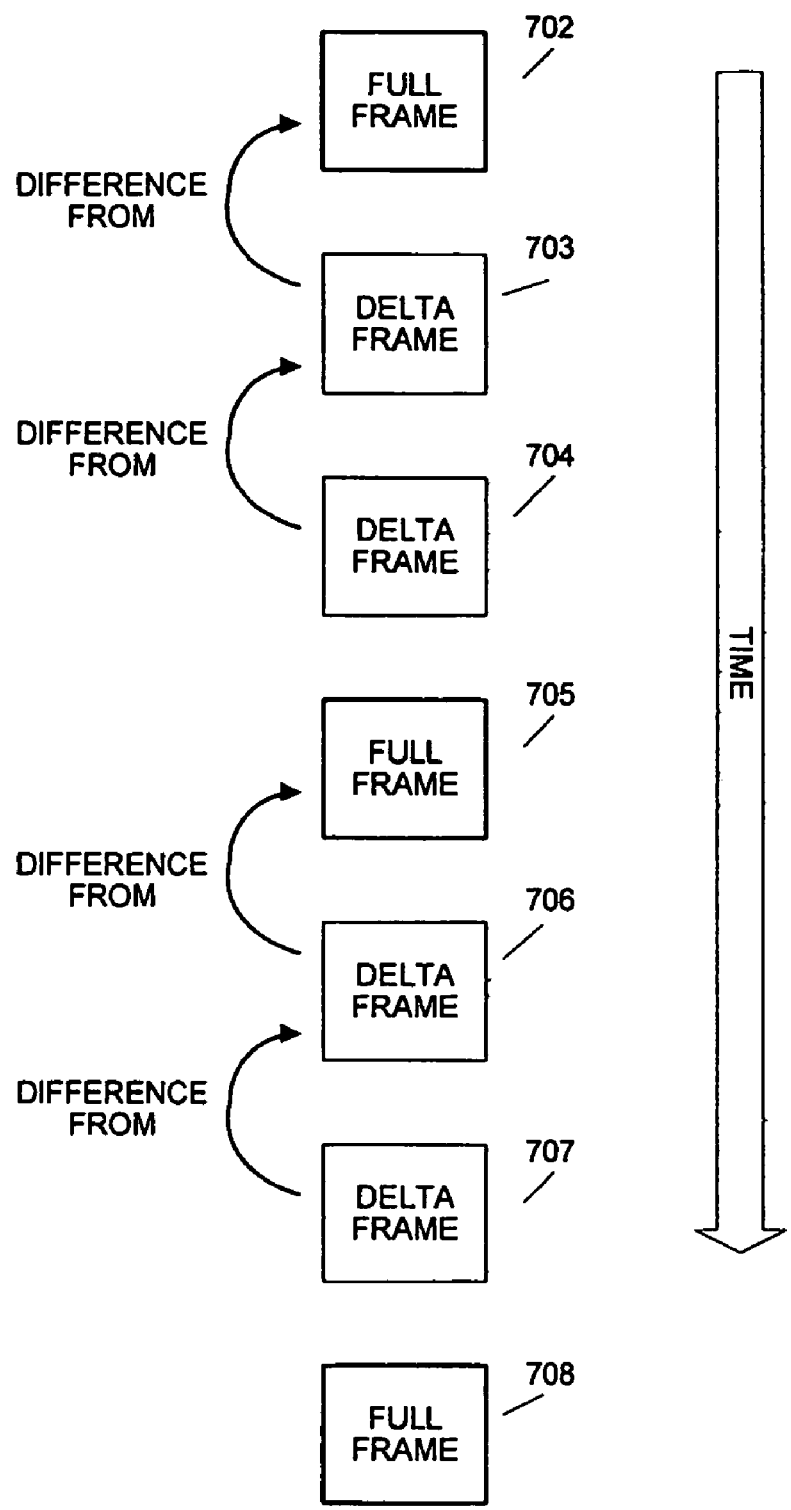
FIG. 7A depicts an example of a method for capturing the contents of a dynamically changing buffer for subsequent playback to clients of different capability.

In one embodiment, the buffer is recorded as a series of full frames with a number of delta frames interspersed between each full frame, such that a full frame contains a complete copy of the buffer at a given point in time. Full frames may also be referred to as key frames. A delta frame contains only the changes to the buffer since a previously captured buffer, where the previously captured buffer may be a full or delta frame. Referring to FIG. 7A, delta frame 703 contains the changes to the buffer since buffer 702 was recorded. Similarly, delta frame 704 contains changes to the buffer since delta frame 703 was recorded. However, full frame 705 contains a complete copy of the buffer. Of course, any permutation of the above is possible. For example, delta frames may contain differences from a full frame other than the most recent full frame, such that redundant full frames are inserted in the encoded file.

This encoding scheme has several advantages upon playback as will be illustrated. In particular, including full frames at intervals in the encoded file ensures that a client receiving a playback of the encoded buffer can synchronize the client buffer with the original buffer by receiving at most the quantity of data in one full frame. Thus a client can never fall behind more than the amount of data in one full buffer.

Another advantage is the accommodation of multiple playback client capabilities. Playback clients can differ in network connection bandwidth or in processor or memory available. These can cause a client to be limited in the rate at which it can receive and process data for playback. The limits can vary by client or network characteristics.

Figure 7B:
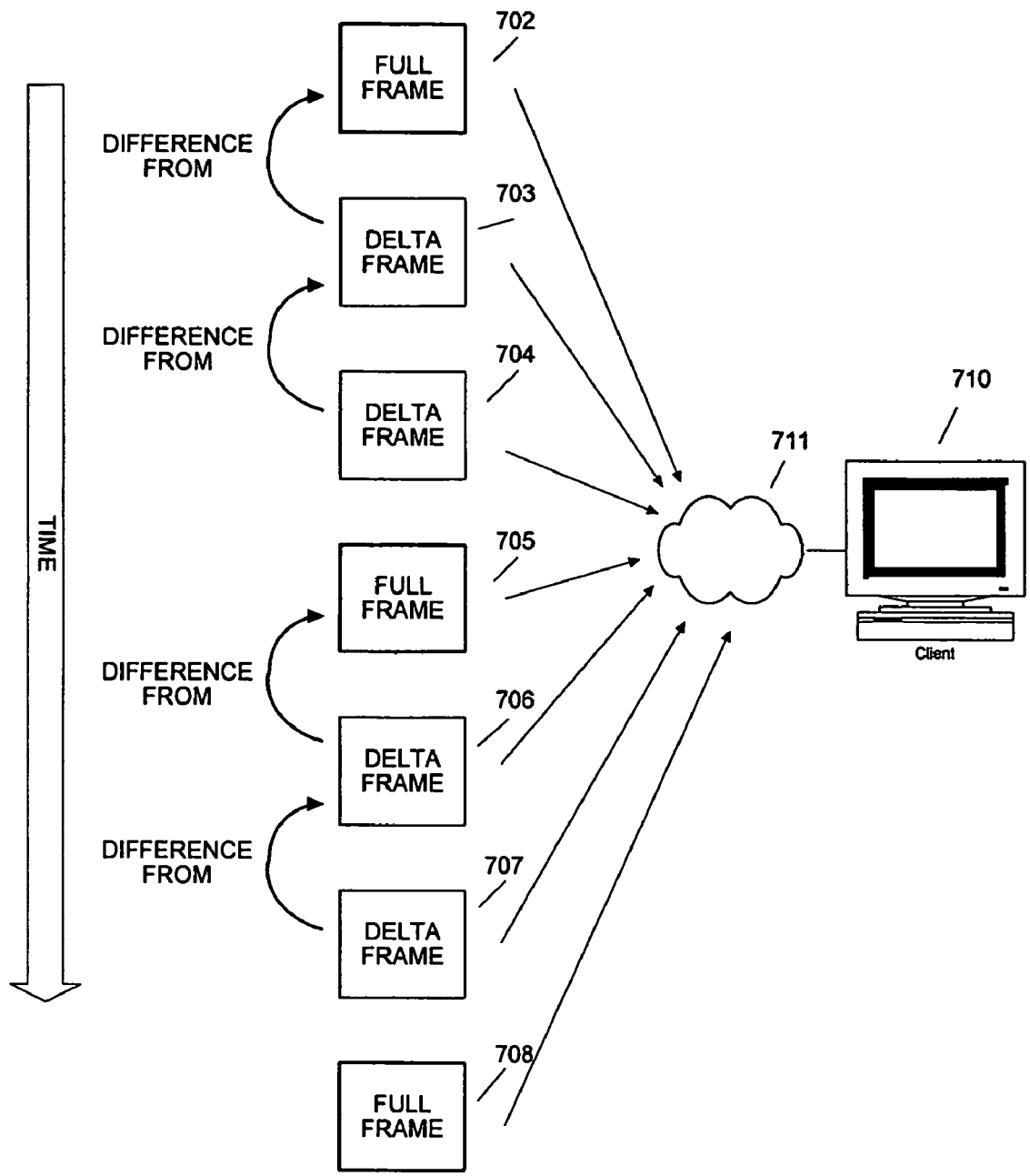
FIGS. 7B, 7C and 7D shows a method for delivering the contents of the file depicted in FIG. 7A to clients of high, medium, and low bandwidth capability.

FIG. 7B illustrates a high-capability client 710 connected to the playback system by high-bandwidth network connection 711. Client 710 receives, processes, and displays all frames 702, 703, 704, 705, 706, 707, 708 and so on.

Figure 7C:
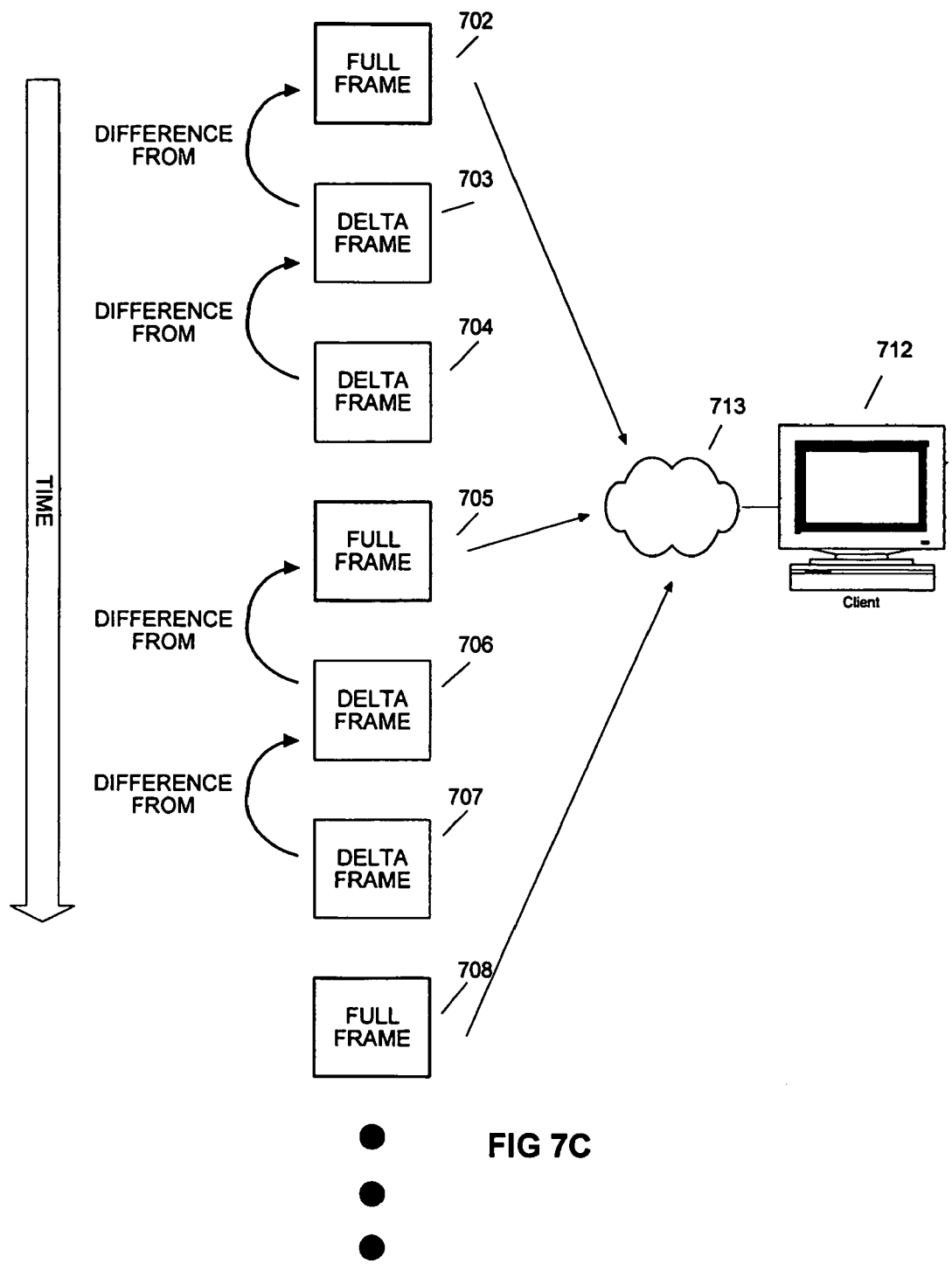

FIG. 7C depicts an intermediate capability client 712 and intermediate capability network connection 713. Because the capability of client 712 and network connection 713 are more limited than high-capability client 710, client 712 can select to only receive full frames corresponding to the sequence 702, 705, 708 and so on in the figure. Thus the rate of data transmission is reduced.

Figure 7D:
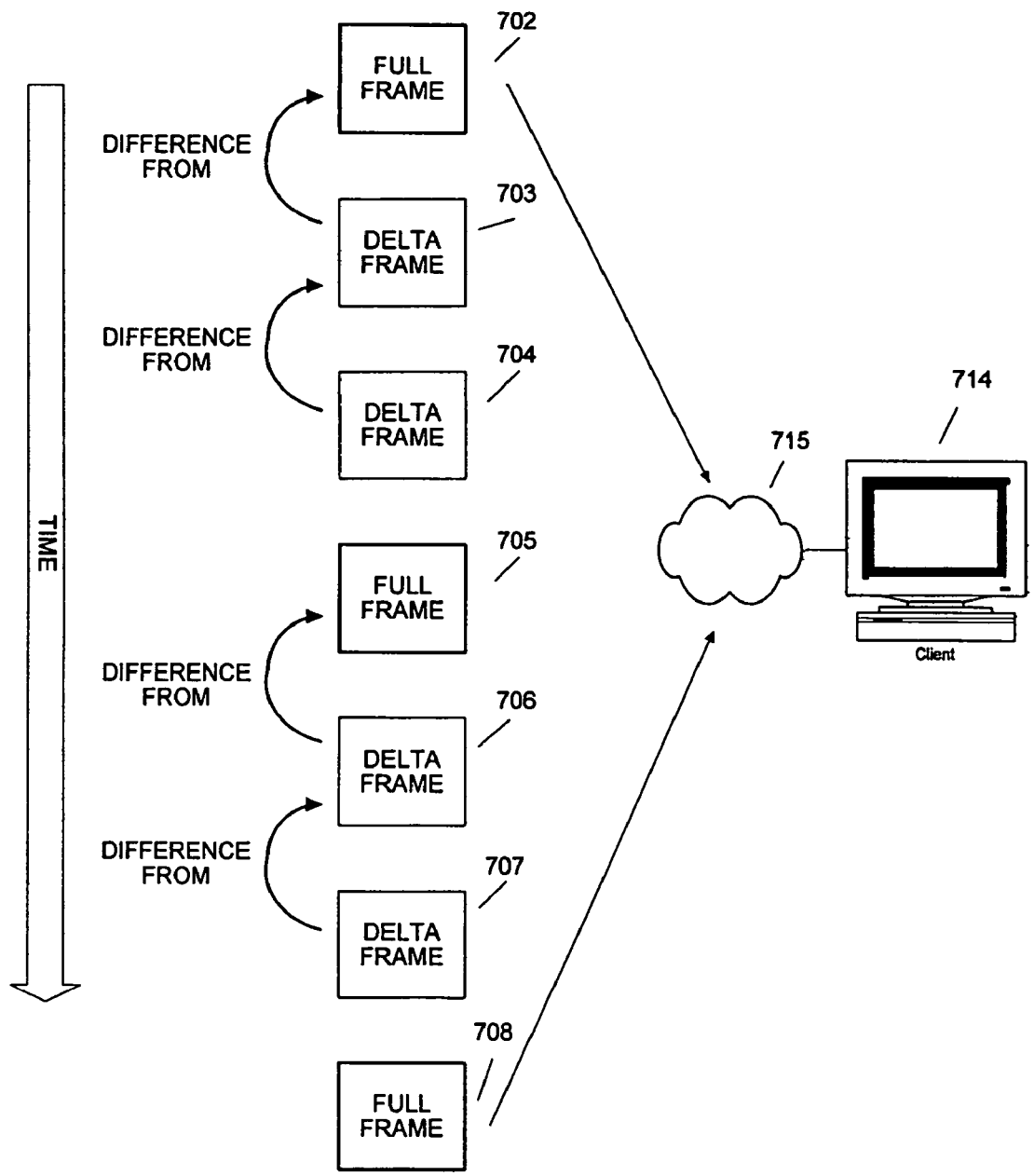

FIG. 7D illustrates a low capability client and low capability network connection. To reduce the data transmission rate further, this client 714 receives only every second full frame, 702 and 705 and so on. It is notable that the same playback file is used for clients 710, 712, and 714. The scheme described above is similar to that used in file formats for Motion Picture Experts Group (e.g. MPEG-4), Apple QuickTime and other available multi-media file formats. Accordingly, these commercial formats may now be employed to encode a recording of a multi-media collaboration session to permit playback on clients of differing capabilities.

Figure 8A:
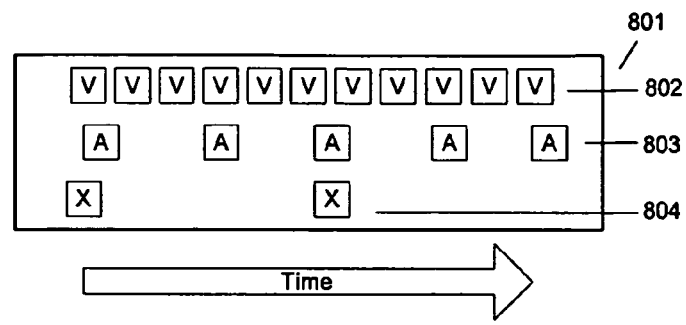
FIG. 8A, 8B and 8C provide an illustration of a mechanism for matching a properly encoded media file to clients of differing capability by selectively enabling media streams at playback.

FIG. 8A illustrates schematically another embodiment of an encoding scheme that can accommodate playback to clients with differing bandwidth needs, for example different capabilities or differing network connection characteristics. With reference to FIG. 8A, an encoded file 801 resulting from recording a collaborative web browsing session is shown schematically. In the illustrated file, three media types 802, 803, 804 are encoded as streams, or as series of buffers.

Media type stream 802 is denoted in the figure by a series of buffers labeled "V." In FIG. 8A, these buffers occur frequently in time so illustrate a high-bandwidth media type. For example, media type stream 802 can result from a recording of a video portion of a collaboration session.

Similarly, media type stream 803 is shown as having fewer buffers in time period to indicate that it uses less bandwidth than media type stream 802. Media type stream 803 is shown as a series of buffers drawn as blocks labeled "A". For example, media type stream 803 can be an audio recording of a collaborative web browsing session.

A third media type stream is shown 804, with buffers denoted by labeling with an "X". The media stream 804 can be for example PowerPoint slide images, and it is illustrated as requiring less bandwidth than media stream 803. Although three media type streams are shown for illustration, there may be more streams or multiple instances of the same type of stream, all as various embodiments according to the descriptions herein.

Figure 8B:
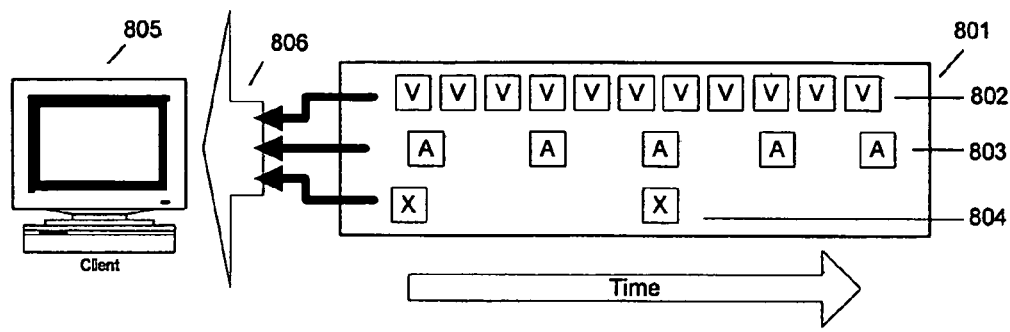
Figure 8C:
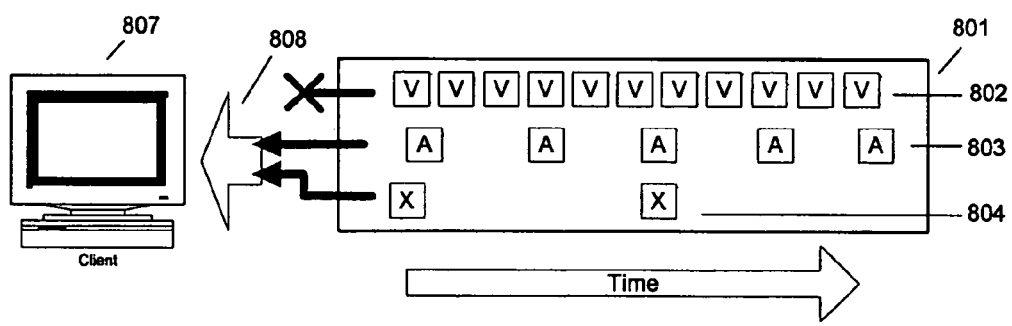

FIG. 8B and 8C show schematically how the media file described above can provide a playback experience to clients of differing capabilities. In FIG. 8B client 805 is connected to the playback system through high-bandwidth network connection 806. As shown, client 805 receives all three media streams 802, 803, and 804.

In FIG. 8C client 807 is connected to the playback system using network connection 808. Network connection 808 is drawn smaller than network connection 806 to illustrate less bandwidth capacity. To permit playback to client 807 without saturating connection 808, a subset of the media streams 802 803 and 804 available in the encoded recording file can be selected for playback. Such selection may be done explicitly, as by a user selection. The selection can also be done automatically in response to information about connection bandwidth and media types. For example, a playback system can be constructed to understand that electing to not deliver a video stream is often an effective means of reducing bandwidth to provide an acceptable playback experience to a client with limited bandwidth capability.

Figure 11:
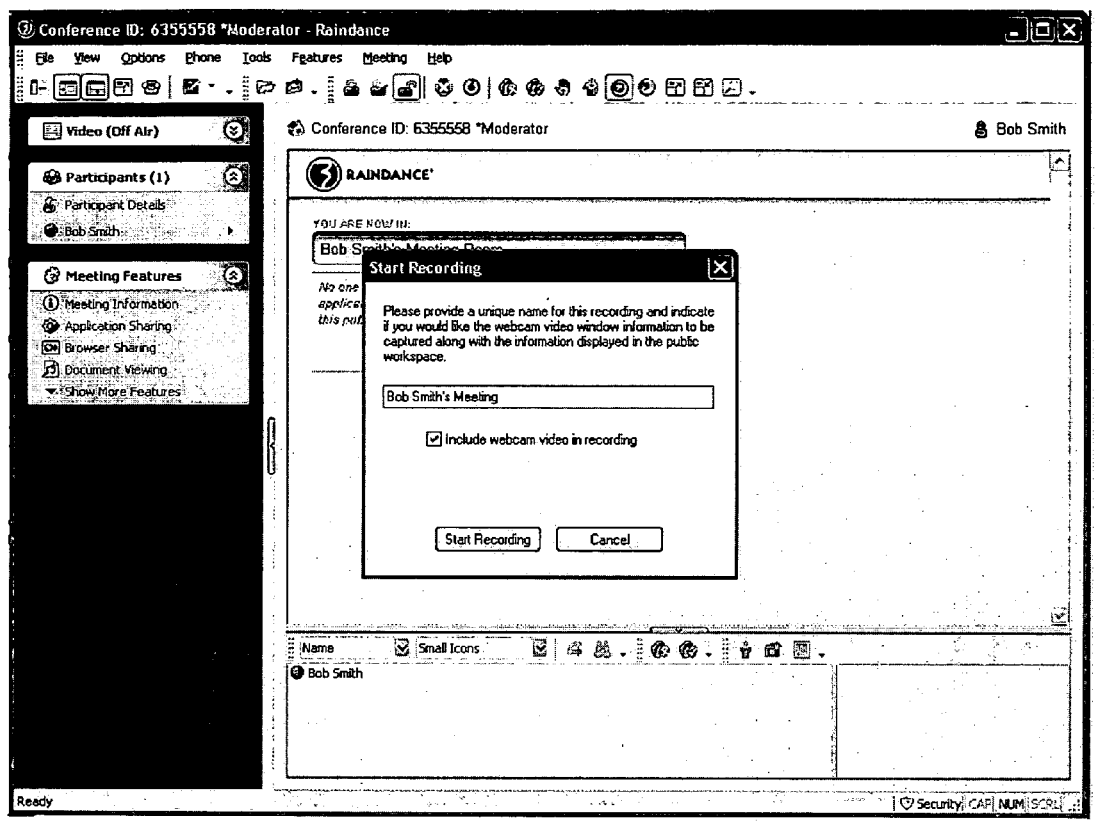
FIG. 11 depicts an example of a configuration window allowing the Presenter to set the name of the archive file and start recording the collaborative Web browsing session.

FIG. 9 illustrates an overview of the play and record system having the unique encoding capabilities. System 900 is a recording system capable of performing processes by which multi-media content is captured, archived, and merged to create a final recording file suitable for playback. Block 901 are meeting participants, corresponding to Block 110 of FIG. 1B. Participants and moderator 901 connect through conference instance 902 to generate various content during the course of the meeting. If a recording has been requested in the meeting, recording service 903 initiates connection of a recording client 904. Record may be initiated by using an interface such as the exemplary interface depicted in FIG. 11. Specifically, FIG. 11 is a screenshot of a configuration window allowing the Presenter to set the name of the archive file and start recording the collaborative Web browsing session.

In one embodiment, recorder client 904 acts as a listen only participant in the meeting, providing a recording of what a user in the meeting would experience using an actual client.

Recorder client 904 captures events into a temporary storage area 905. In one embodiment, a separate audio recording storage area 906 temporarily stores the audio content recorded from people who speak in the meeting. In one embodiment the audio recording content is obtained from an interface to a telephone recording system. In another embodiment, the meeting audio connection is provided over a packet switched network (e.g. voice over IP) and the temporary audio storage 906 is obtained from the voice packets.

Encoder client 907 transcodes and merges stored media 905 into file 909. In some embodiments audio processing 908 is required prior to merging audio and visual data. Encoder 907 is described further in conjunction with FIG. 10.

Figure 10:
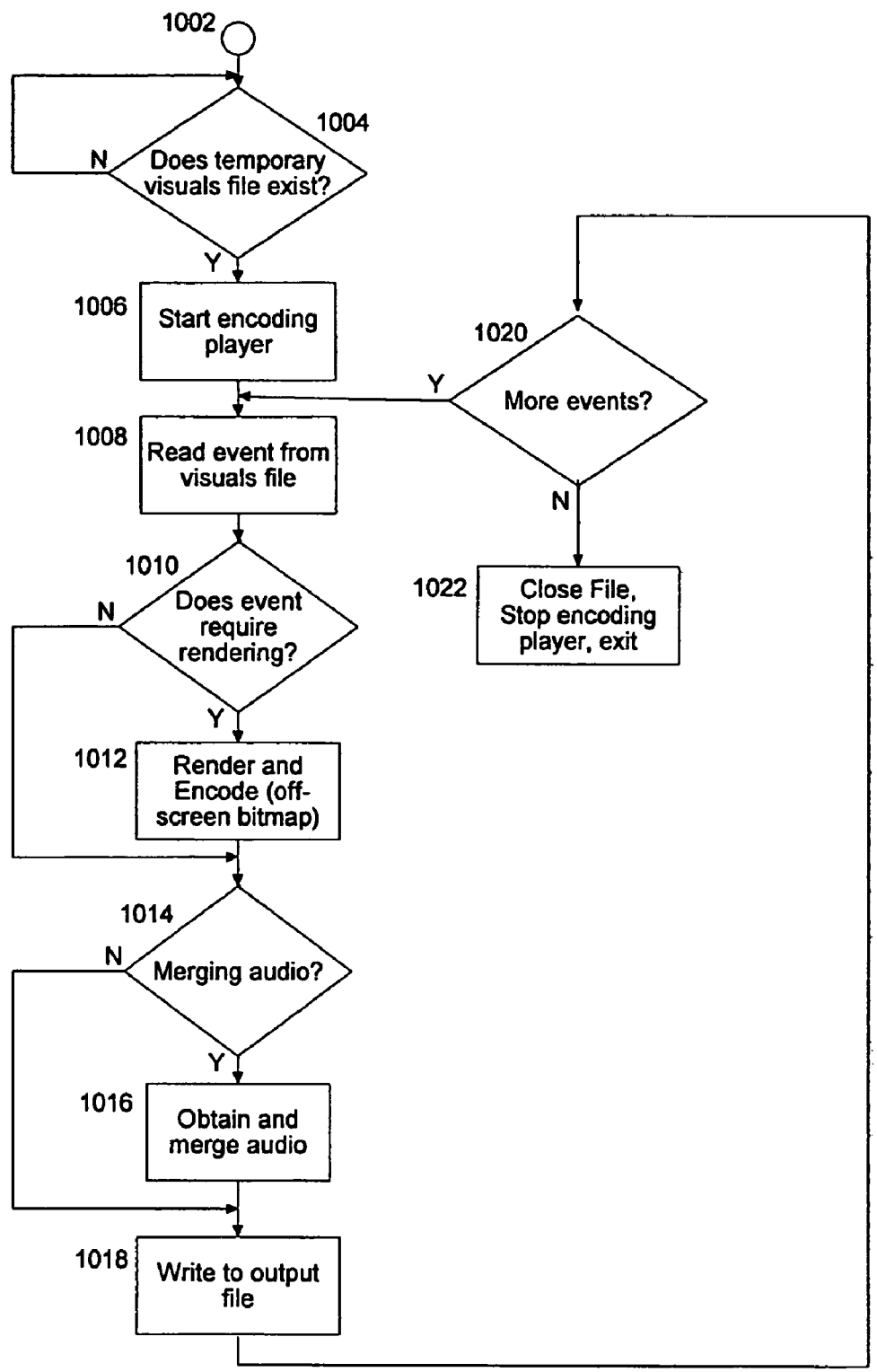
FIG. 10 is a flow chart depicting an example of a method for encoding and merging events and data to create a media archive file.

FIG. 10 is a flow chart illustrating the details of encoding process stage 907 of FIG. 9 Entry 1002 begins the sequence. Upon entry, the system waits for a visuals event file to appear at decision step 1004. When such a file is present, an encoding player is started in block 1006. The encoding player receives events and in one embodiment performs rendering and encoding steps described above with respect to FIGS. 7 and 8.

In block 1008 a visual event is read from the file for processing and encoding. Depending on the type of event, it may be suitable for insertion into the recording file or may require rendering, and this decision is made at block 1010. If rendering is required, a version of the display seen during the collaboration session is produced in an internal memory area, also called an off-screen bitmap, at block 1012. The off-screen bitmap can then be encoded, in one embodiment, for recording. In one embodiment, this is done using the VNC software for synchronizing buffers.

In one embodiment the encoding of video frames and off-screen buffers is performed to enable the accommodation of different playback client capabilities as described further in conjunction with FIGS. 7A- 7D.

It can be advantageous to record each media type as a separate track or stream in the recording file, to enable the playback filtering described in conjunction with FIGS. 8A-8C. For example, video, audio, and application sharing data events can be placed respectively in three different tracks in the output file. Accordingly, in one embodiment the events are written to the output file such that on playback the media type of each can be determined and used to apply different processing to each according to media type.

Whether a rendering step was required or not, the data is ready for placing into a recording file upon entry to decision block 1014. In some embodiments, audio data is merged later. In an embodiment, audio data may be merged in step 1016.

In step 1018 the visual and audio events are synchronized and placed into the proper format for the selected output file format and type. The process continues through decision block 1020 as long as events are available to be processed. When all events are processed, the system cleans up and exits through block 1022.

Figure 15A:
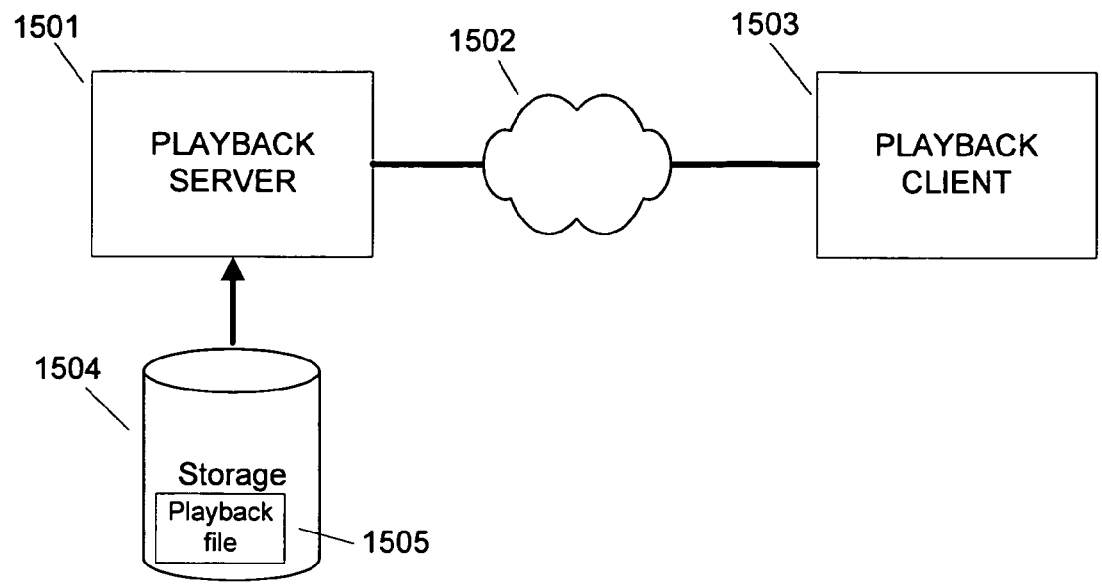
FIG. 15A and 15B are block diagrams depicting operational environments according to examples of the playback systems and methods described herein.

Turning now to FIG. 15, block diagrams illustrate embodiments of playback architectures. Specifically, FIG. 15A shows a playback client 1503 and a playback file 1505 that is to be played back on playback client 1503. Playback file 1505 can contain a recording of media presented during a collaborative communication session as shown as the final recording file 909 in FIG. 9. FIG. 15A illustrates an embodiment where the playback file 1505 is stored on a storage device 1504 that is remote from playback client 1503 and the playback file must be delivered through network 1502. In one embodiment playback server 1501 manages delivery of file 1504 through network 1502 for replay on playback client 1503.

Figure 16:
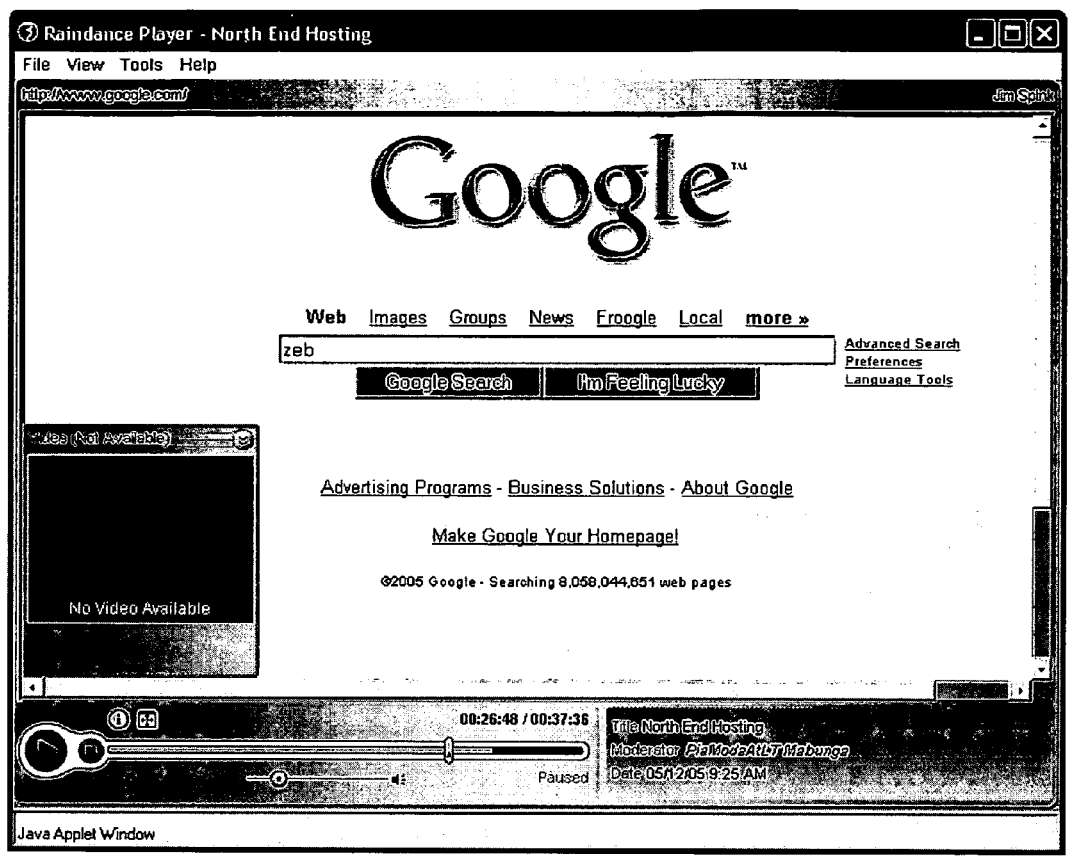
FIG. 16 depicts an example of a window associated with an example of a playback client.

As described in the discussion of FIGS. 7A-7D and 8A-8C, the delivery of the playback file 1505 can include filtering or processing by server 1501 to accommodate variations in characteristics of network connection 1502 and characteristics of client 1503. Thus in one embodiment, only selected parts of playback file 1505 are delivered to playback client 1503. Managing the playback file may be accomplished using a playback client interface. FIG. 16 is an exemplary screen shot of a window associated with an playback client configured to play back files according to the playback client's permission, capabilities and preferences as described herein.

In one embodiment, playback server 1501 receives a playback request from playback client 1503. Playback server 1501 then can validate the credentials or challenge client 1503 to verify the client is authorized to view the specific requested playback file 1505. Playback authorization can be based on criteria such as preferences and permissions set by the owner or originator of file 1505, organizational affiliation of the user of client 1503, network address of the client 1503, credentials supplied by client 1503.

Several network configurations and connection methods can be employed without departing from the description herein. For example in one embodiment network 1502 can be the Internet. In another embodiment network 1502 can be a private or local area network.

In one embodiment, playback server 1501 is an instance of the same type of server as conference server 140 shown in FIG. 1B. In another embodiment, the playback client 1503 is an instance of the same application as client depicted in FIG. 12. However, it can be advantageous to have a playback mechanism comprising different components or different types of components from those used in the recording process. For example, recording components can be conference resources which are expensive and limited in number and therefore it can be desirable to not utilize those resources during subsequent playback sessions.

Accordingly, with reference to FIG. 15A, in one embodiment playback server 1501 is a server designed to provide playback of recorded files. In this embodiment, playback server 1501 is of a different type from components used in the recording process. In one embodiment playback server 1501 can be specifically designed to include functions for playback of a previously recorded collaborative communication session. Server 1501 can be entirely proprietary or incorporate proprietary components. In another embodiment playback server 1501 can be an instance of commercially available media server software. For example, server 1501 can be a server from Apple computer for playback of QuickTime media format. In another embodiment server 1501 can be a combination of commercially available or open-source software with proprietary extensions of modules incorporated.

Figure 12:
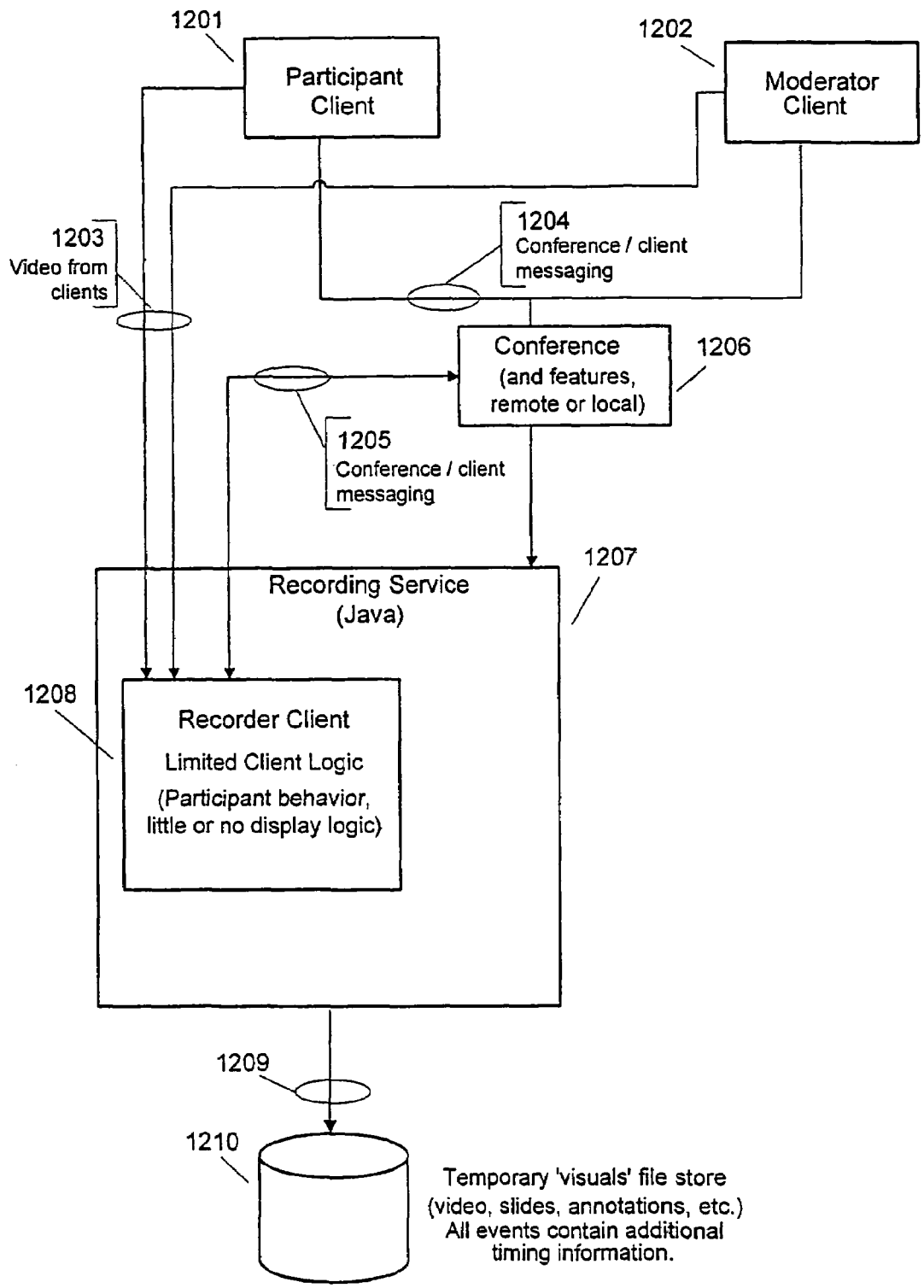
FIG. 12 is a block diagram of a collaborative communication system illustrating an example of how a recording can be made for later playback.

With reference FIG. 15A and playback client 1503, several exemplary embodiments are described below. In one embodiment playback client 1503 is an instance of the same application as participant clients 1201 or 1202 (FIG. 12). In another embodiment, playback client 1503 can be a proprietary application designed for the purpose of playing media files from collaborative communications sessions. In another embodiment, playback client 1503 can be a commercially available media player application, for example Apple QuickTime player or Microsoft Media Player. In still another embodiment, playback client 1503 can be a commercially available player that includes extensions or plug-ins to enable playing of certain media types. Thus player 1503 can be a combination of commercial and proprietary software. For example plug-ins can be designed specifically to enable replay of certain media types, encodings, or formats found in recorded collaborative communication sessions.

Figure 15B:
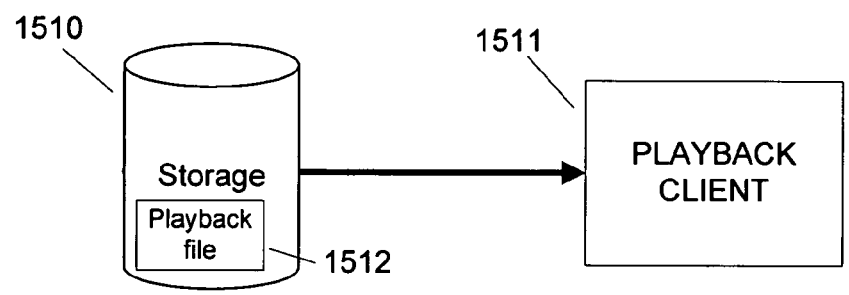

FIG. 15B illustrates an alternative embodiment where playback client 1511 replays a previously recorded collaboration archive file 1512, where file 1512 is stored on a local storage device 1510. For example, file 1512 may have been downloaded or stored previous to playback or obtained on distributed media such as CD-ROM. This can be advantageous if playback client 1511 is not connected to a network, or if the playback file desired is not available on a network reachable by playback client 1511. This can also be advantageous for security reasons, it is desired that the playback file 1512 not be available through a network.

In one embodiment, the playback can employ a hybrid scheme that mixes desirable aspects of progressive download and normal media streaming. In progressive download the client downloads the entire file to be replayed, but the client can start replaying the session before the entire file has been retrieved. A difficulty with the progressive download approach is that it is not possible for the user to fast-forward to a point past data already downloaded. Also, since web conferencing recordings can be very large, a problem can arise if storage space required for the replayed file exceeds available disk space. Normal media streaming on the other hand typically encodes data at a fixed data rate and usually requires that all media stream data includes closely spaced key frames, which is not always possible or desirable.

In one embodiment of the hybrid playback scheme described above, the playback can be designed to compensate for variations in instantaneous bandwidth required to replay recorded media streams. It is often desired to replay collaborative communication sessions in real time, so that during playback events are spaced similarly to when they occurred during the session from which the recording was made. Thus a 200 minute collaborative communication session will replay in 200 minutes unless the viewer rewinds or skips ahead in the playback file. However, the bandwidth required to deliver all of the recorded media streams in real time can vary dramatically from moment to moment as playback progresses because the bandwidth required by any one media stream can vary from moment to moment.

In one embodiment, the playback client 1511 continuously reads data corresponding to future playback into a data buffer. Thus by reading ahead of the time point currently being replayed, bandwidth usage can be averaged out over time so that the uneven bandwidth required to download the playback file can be matched to the effective bandwidth of the network connection and playback client.

In one embodiment, the playback client attempts to maintain a full buffer of some fixed size. For example, buffer size can be selected to contain ten minutes of playback data. As another example, a buffer size can be selected to contain a fixed amount of data.

This hybrid approach has the advantage of allowing seeking, and it doesn't require downloading the entire file, but it also allows playback media types that do not have fixed bandwidth encoding.

FIG. 12 shows a block diagram of a recording architecture according to one embodiment of the description herein. A collaborative communication session comprises a Conference 1206 and a Moderator Client 1202, and can also include one or more Participant Clients 1201. Features of the Conference 1206 can include for example, video, audio, shared whiteboards, and the features can be implemented in a local or remote location. Clients 1201 and 1202 exchange data and messages with the conference using messaging 1204 to enable the features. In one embodiment, the clients 1201 and 1202 exchange video streams as part of the collaborative session.

When recording is desired, Recording Service 1207 can connect an instance of a Recorder Client 1208 to Conference 1206. Recorder Client 1208 can be similar to a Participant Client 1201, except no human user is associated with Recording Client 1208. Thus Recorder Client 1208 connects to conference 1206 using messaging 1205. Messaging Scheme 1205 can be similar to Messaging 1204 since both enable interaction of a client with a conference. Alternatively, Messaging 1205 can include some additional aspects specific to the needs of Recording Client 1208. For example, a client associated with a human user can allow certain display settings and selections to be made by the associated user. A recording client has no human user and so it can be desirable to provide messaging to reflect this. In one embodiment, the display selections used by Recording Client 1208 mimic the display as seen on Moderator Client 1202.

In one embodiment, the collaboration session can include video between participants. In this case, Recorder Client 1208 can receive and process video streams 1203 from clients to accomplish their recording. A primary function or Recorder client 1208 is to store conference displays in Temporary Visuals File 1210, using communication path 1209. File 1210 can be used to generate a an archive file for later playback of the session.

Figure 13A:
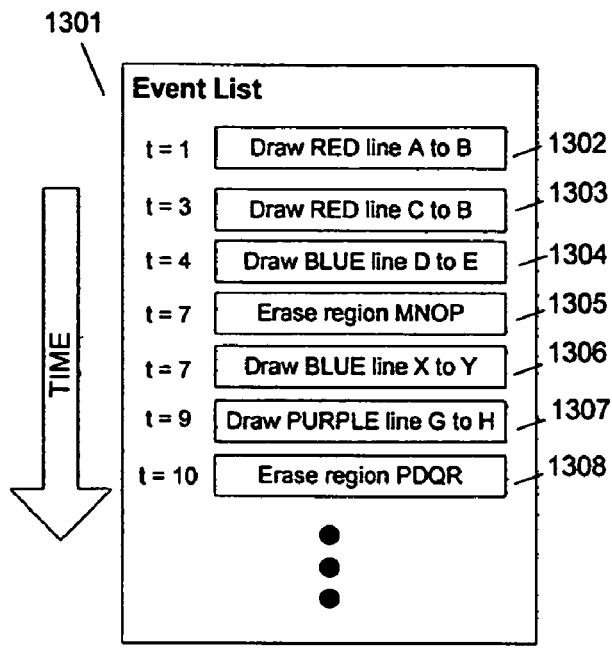
FIGS. 13A-13B is an example of an encoding step whereby an event-based media stream is converted to frame-based media stream.
Figure 13B:
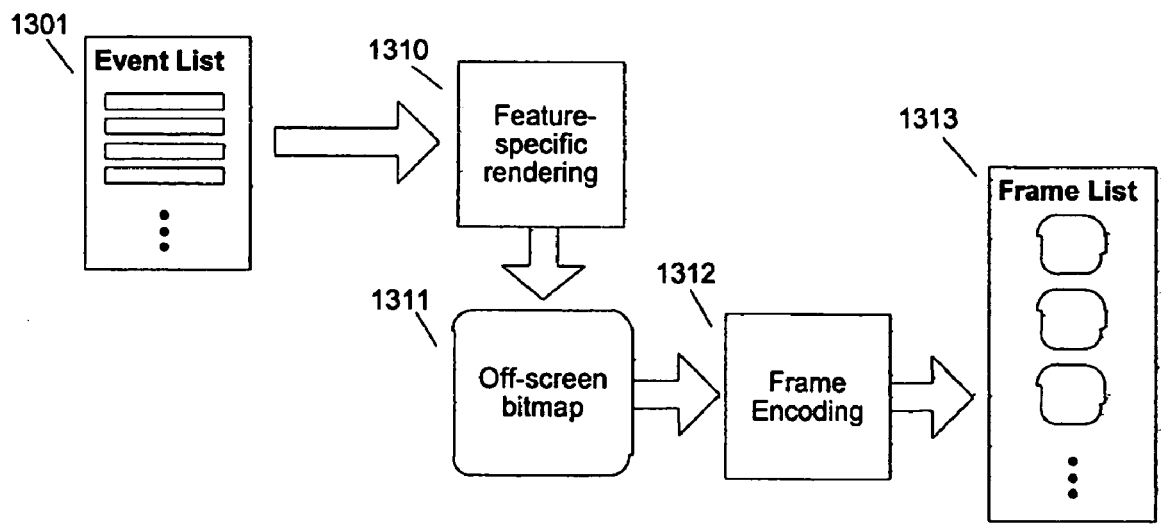

FIGS. 13A and 13B illustrate an embodiment according to the description herein that provides a mechanism for encoding certain media types for playback to clients of differing capability. As described herein, it can be desirable to have a series of frame buffers in the file used for playback, so that different sets of frame buffers can be delivered to clients and connections of differing capability. However, some media types generate an event list rather than a buffer sequence.

FIG. 13A shows an event list 1301 that could result from a feature. Several events 1302, 1303, 1304, 1305, 1306, 1307, and 1308 are shown as representative elements in the event list 1301. The events shown are for illustration only, and different features would generate lists specific to the needs of the feature. Additionally, it should be noted that only a small series of events are shown for clarity but event lists can contain any number of events. For example, the events (1302-1308) shown in feature list 1301 can be the result of a shared whiteboard feature, and the events indicate a series of changes to be applied to each user's whiteboard display.

However it can be undesirable to have an event list as an archive for later playback. When the contents of a buffer at any point in time depend on a potentially unbounded series of preceding events, it can be difficult to move in the buffer, for example to move around in the file i.e. fast-forward or rewind. It can also be difficult to adjust to different client capabilities because all clients receiving the playback must receive all events. Thus, FIG. 13B illustrates a mechanism according to one embodiment of the description herein that provides for conversion of an event list to a more desirable buffer list.

With reference to FIG. 13B, event list 1301 is presented to an application 1310 that provides rendering of the events to an off-screen bit map 1311. Application rendering 1310 must be capable of interpreting the events in list 1301, thus rendering 1310 is feature specific. For example, if event list 1301 contains events related to a conference feature providing drawing on a shared whiteboard, then rendering application 1310 interprets the events and draws the whiteboard display into bitmap 1311. Thus, at any time bitmap 1311 reflects the whiteboard display with all of the events received up to the current point in time applied.

Next, the bitmap 1311 is encoded as a series of buffers as shown in FIG. 7A. This is accomplished by frame encoding engine 1312. In one embodiment, the frame encoding engine implements the VNC protocol for synchronizing buffers. The output of the frame encoder is frame list 1313. Frame list 1313 contains the same information as event list 1301, but frame list 1313 has features that make it more suitable for playback, as described in association with FIGS. 7A-7D.

While the particular record and playback of a collaborative communication session herein shown and described in detail is fully capable of attaining the above described objects of this invention, it is to be understood that the description and drawings represent the presently preferred embodiment of the invention and are, as such, a representative of the subject matter which is broadly contemplated by the present invention. It is further understood that the scope of the present invention fully encompasses other embodiments that may become obvious to those skilled in the art, and that the scope of the present invention is accordingly limited by nothing other than the appended claims.

What is claimed is:

1. A computer implemented method for recording a collaborative communications session comprising:
   at a first computer, sending a plurality of media type data used in said collaborative communication session to a recorder client;
   at said recorder client, preparing a file of said collaborative communications session configured for playback according to a second computer's processing capabilities, wherein the preparation of said file includes:
      encoding each of said plurality of media type data into a plurality of media type streams using a mixture of key frames and delta frames; and
   at a second computer, playing back said file by selecting at least one of the media type streams that matches the second computer's processing capabilities.

2. The computer implemented method of claim 1, wherein one or more of the plurality of the media type data is an audio data element.

3. The computer implemented method of claim 1, wherein one or more of the plurality the media type data is visual data element.

4. The computer implemented method of claim 1, wherein the key frame contains a complete copy of a buffer at a given point in time.

5. The computer implemented method of claim 1, wherein the delta frame is configured to include only changes to the buffer since a previously captured buffer.

6. The computer implemented method of claim 1 wherein the plurality of media data types are encoded, stored separately and later merged into the file.

7. The computer implemented method of claim 1 wherein one of the plurality of media data types comprises visual data elements that include images dynamically integrated into the collaborative communication session.

8. The computer implemented method of claim 1, wherein the processing capability is the bandwidth connection.

9. The computer implemented method of claim 1, wherein the processing capability is the media type applications available on said computer.

10. The computer implemented method of claim 1, wherein the preparation of said file further includes:
    recording each media type data as a separate track; and
    synchronizing and merging the plurality of media type streams.

11. The computer implemented method of claim 10, wherein the recording further includes recording the media type data such that on playback the media type of each media type stream can be determined and used to apply different processing to each according to media type.

12. A method for recording a collaborative communications session, comprising:
    receiving a plurality of media type data from a collaborative communication session for recording;
    encoding each of the plurality of media type data into a plurality of media type streams using a mixture of full frames and delta frames;
    merging the plurality of media type streams into a file for playback, wherein the file is configured to allow a subset of the plurality of media type streams to play according to a playback device's processing capabilities.

13. The method of claim 12, wherein the at least one of the plurality of media type data is audio and at least one of the plurality of media type data is visual, and the subset of the media type streams played during playback comprises audio.

14. The method of claim 12, wherein the at least one of the plurality of media type data is audio and at least one of the plurality of media type data is visual, and the subset of the merged media type streams played during playback comprises audio and visual.

15. A system for recording a collaborative communication session, comprising:
    a recorder client configured to receive a plurality of media type data from a collaborative communication session for recording;
    an encoder client coupled to said recorder client, the encoder client configured to encode each of the plurality of media type data into a plurality of media type streams using a mixture of full frames and delta frames;
    the encoder client further configured to merge the plurality of media type streams into a file for playback, wherein the file is configured to allow a subset of the plurality of media type streams to play according to a playback device's processing capabilities.

16. The system of claim 15, wherein the at least one of the plurality of media type data is audio and at least one of the plurality of media type data is visual, and the subset of the media type streams played during playback comprises audio.

17. The system of claim 15, wherein the at least one of the plurality of media type data is audio and at least one of the plurality of media type data is visual, and the subset of the merged media type streams played during playback comprises audio and visual.

* * * * *